US008282495B2

(12) United States Patent
Hoshino et al.

(10) Patent No.: US 8,282,495 B2
(45) Date of Patent: Oct. 9, 2012

(54) FIXED TYPE CONSTANT VELOCITY UNIVERSAL JOINT

(75) Inventors: Manabu Hoshino, Iwata (JP); Teruaki Fujio, Iwata (JP); Tohru Nakagawa, Iwata (JP); Wasaburo Suganuma, Iwata (JP)

(73) Assignee: NTN Corporation, Osaka (JP)

( * ) Notice: Subject to any disclaimer, the term of this patent is extended or adjusted under 35 U.S.C. 154(b) by 340 days.

(21) Appl. No.: 12/532,702

(22) PCT Filed: Mar. 21, 2008

(86) PCT No.: PCT/JP2008/055271
§ 371 (c)(1),
(2), (4) Date: Oct. 8, 2009

(87) PCT Pub. No.: WO2008/117749
PCT Pub. Date: Oct. 2, 2008

(65) Prior Publication Data
US 2010/0062865 A1    Mar. 11, 2010

(30) Foreign Application Priority Data

Mar. 27, 2007  (JP) ................................. 2007-082370
Apr. 25, 2007  (JP) ................................. 2007-115701
Jul. 31, 2007   (JP) ................................. 2007-199518

(51) Int. Cl.
*F16D 3/224*    (2006.01)
(52) U.S. Cl. ........................................ 464/145; 464/906
(58) Field of Classification Search .................... 464/15, 464/140, 145, 906
See application file for complete search history.

(56) References Cited

U.S. PATENT DOCUMENTS 2,949,022 A * 8/1960  Leon ........................ 464/145 X
3,287,934 A * 11/1966  Asher ....................... 464/145 X
(Continued)

FOREIGN PATENT DOCUMENTS
EP       1 296 079       3/2003
(Continued)

OTHER PUBLICATIONS

International Preliminary Report on Patentability and Written Opinion of the International Searching Authority dated Oct. 29, 2009 in International (PCT) Application No. PCT/JP2008/055271.

(Continued)

*Primary Examiner* — Dan Stodola
*Assistant Examiner* — Matthieu Setliff
(74) *Attorney, Agent, or Firm* — Wenderoth, Lind & Ponack, L.L.P.

(57) ABSTRACT

A fixed type constant velocity universal joint is capable of, without involving decreases in load capacity of an inner joint member (inner member) and in spherical area, increasing rigidity of a cage and stabilizing durability. The cage has four pockets including a pair of long pockets with large circumferential intervals and a pair of short pockets with small circumferential intervals. The pair of long pockets can be shifted by 180 degrees along a circumferential direction, and the pair of short pockets can be shifted by 180 degrees along the circumferential direction. The long pockets and the short pockets are arranged alternately to each other along the circumferential direction. Two balls are accommodated in each of the long pockets, while one ball is accommodated in each of the short pockets. A cutout portion is provided to an inner end portion of at least one of the track grooves of the inner member.

8 Claims, 31 Drawing Sheets

U.S. PATENT DOCUMENTS

| | | | |
|---|---|---|---|
| 3,412,580 A * | 11/1968 | Cull | 464/145 |
| 3,553,979 A * | 1/1971 | Noguchi et al. | 464/145 |
| 4,575,362 A | 3/1986 | Girguis | |
| 4,820,240 A | 4/1989 | Girguis | |
| 6,299,542 B1 | 10/2001 | Ouchi et al. | |
| 6,478,683 B1 | 11/2002 | Ouchi et al. | |
| 7,637,819 B2 * | 12/2009 | Feichter et al. | 464/906 X |
| 7,951,009 B2 * | 5/2011 | Hoshino et al. | 464/145 |
| 2001/0021671 A1 | 9/2001 | Ouchi et al. | |
| 2001/0024976 A1 | 9/2001 | Ouchi et al. | |
| 2003/0054893 A1 | 3/2003 | Thomas | |
| 2003/0083135 A1 | 5/2003 | Yamazaki et al. | |
| 2004/0102251 A1 | 5/2004 | Sone et al. | |
| 2005/0170898 A1 | 8/2005 | Mochinaga et al. | |
| 2006/0211503 A1 | 9/2006 | Suzuki et al. | |
| 2007/0161428 A1 | 7/2007 | Nakao et al. | |
| 2009/0048030 A1 | 2/2009 | Mochinaga et al. | |
| 2010/0029396 A1 | 2/2010 | Fujio et al. | |

FOREIGN PATENT DOCUMENTS

| | | |
|---|---|---|
| EP | 1 703 158 | 9/2006 |
| GB | 1 537 067 | 12/1978 |
| GB | 2 127 132 | 4/1984 |
| JP | 48-21363 | 6/1973 |
| JP | 3859264 | 12/1997 |
| JP | 11-303882 | 11/1999 |
| JP | 2003-130082 | 5/2003 |
| JP | 2004-116666 | 4/2004 |
| JP | 2006-194268 | 7/2006 |
| JP | 2007-064264 | 3/2007 |
| WO | 2008/032600 | 3/2008 |

OTHER PUBLICATIONS

Supplementary European Search Report issued Dec. 2, 2011 in corresponding European Application No. 08738694.2.

International Search Report dated May 27, 2008 for International Application No. PCT/JP2008/055271.

* cited by examiner

FIXED TYPE CONSTANT VELOCITY UNIVERSAL JOINT

TECHNICAL FIELD

The present invention relates to a fixed type constant velocity universal joint, in particular, a fixed type constant velocity universal joint which is used for a power transmission system in automobiles or various industrial machines and allows only angular displacement between two shafts on a driving side and a driven side.

BACKGROUND ART

A fixed type constant velocity universal joint is an example of a constant velocity universal joint used as means for transmitting torque from an engine of an automobile to wheels at constant velocity. The fixed type constant velocity universal joint connects two shafts on a driving side and a driven side and is provided with a structure allowing constant-velocity transmission of rotational torque even when the two shafts assume an operating angle. Generally, as an example of the widely-known fixed type constant velocity universal joint described above, there may be given one adopting a birfield type (BJ) or an undercut free type (UJ).

For example, as illustrated in FIGS. 28 and 29, the fixed type constant velocity universal joint of the BJ type includes an outer joint member 3 as an outer member having an inner spherical surface 1 in which multiple track grooves 2 are equiangularly formed along an axial direction, an inner joint member 6 as an inner member having an outer spherical surface 4 in which multiple track grooves 5 paired with the track grooves 2 of the outer joint member 3 are equiangularly formed in the axial direction, multiple balls 7 interposed between the track grooves 2 of the outer joint member 3 and the track grooves 5 of the inner joint member 6 so as to transmit torque, and a cage 8 interposed between the inner spherical surface 1 of the outer joint member 3 and the outer spherical surface 4 of the inner joint member 6 so as to retain the balls 7. In the cage 8, there are circumferentially arranged multiple pockets 9 for accommodating the balls 7.

A center curvature O2 of the track grooves 5 of the inner joint member 6 and a center curvature O1 of the track grooves 2 of the outer joint member 3 are offset (track offset) with respect to a joint center O by equal distances F, F in opposite directions along the axial direction, respectively.

Further, as illustrated in FIGS. 30 and 31, the fixed type constant velocity universal joint of the UJ type includes an outer joint member 3 as an outer member having an inner spherical surface 1 in which multiple track grooves 2 are equiangularly formed along an axial direction, an inner joint member 6 as an inner member having an outer spherical surface 4 in which multiple track grooves 5 paired with the track grooves 2 of the outer joint member 3 are equiangularly formed in the axial direction, multiple balls 7 interposed between the track grooves 2 of the outer joint member 3 and the track grooves 5 of the inner joint member 6 so as to transmit torque, and a cage 8 interposed between the inner spherical surface 1 of the outer joint member 3 and the outer spherical surface 4 of the inner joint member 6 so as to retain the balls 7. In the cage 8, there are circumferentially arranged multiple pockets 9 for accommodating the balls 7.

Each of the track grooves 2 of the outer joint member 3 is constituted by an inner side track groove 2a having a track groove bottom constituting an circular-arc portion and by an opening side track groove 2b having a track groove bottom constituting a straight portion parallel to an axial line of the outer joint member. In the inner side track groove 2a, the center curvature O1 thereof is shifted from the joint center O to an opening side of the outer joint member 3 in an axial direction. Further, each of the track grooves 5 of the inner joint member 6 is constituted by an inner side track groove 5a having a track groove bottom constituting a straight portion parallel to an axial line of the inner joint member and by an opening side track groove 5b having a track groove bottom constituting an circular-arc portion. The center curvature O2 of the opening side track groove 5b is provided while being separated in the axial direction from the joint center O by equal distances k to an inner side opposite to the center curvature O1 of the inner side track groove 2a of the outer joint member 3.

Further, in an outer spherical surface 8a of the cage, a center curvature O3 thereof is shifted from the joint center O to an opening side of the cage 8 in an axial direction, and in an inner spherical surface 8b of the cage, a center curvature O4 thereof is provided while being separated in the axial direction from the joint center O by equal distances k1 to the inner side opposite to the center curvature O3 of the outer spherical surface 8a of the cage. In the conventional fixed type constant velocity universal joint of this type, track offset amounts of the inner and outer joint members are set to be large, and an offset amount of the cage is set to be small. Further, pitch angles of two of the balls 7, which are adjacent to each other, are 60 degrees. That is, the balls 7 include six balls arranged at pitches of 60 degrees along a circumferential direction.

In recent years, in order to achieve compactification, there has been provided a fixed type constant velocity universal joint for an automobile, which is provided with eight balls as illustrated in FIG. 29 (Patent Document 1). In this case, a ratio between a pitch circle diameter of balls and a diameter of the balls is set to a predetermined value. In this context, the pitch circle diameter of the balls is represented by 2×PCR. Further, PCR represents a length of a line connecting the center of the track grooves of the outer joint member or the center of the track grooves of the inner joint member and the centers of the balls.

That is, in comparison with the fixed type constant velocity universal joint provided with six balls, in the fixed type constant velocity universal joint for an automobile, which is described in Patent Document 1, the balls are downsized and the number of the balls is increased. In this case, in accordance with downsizing of the balls, a load level of torque capable of being born by each of the balls is lowered. In order to compensate this, the number of balls is increased from six to eight.

However, when the number of the balls is to be increased for the purpose of further compactification of the outer diameter of the constant velocity universal joint, pillar widths (circumferential lengths) between the pockets of the cage are reduced. The rigidity of the pillar portions of the cage is important in securing joint strength at the time of a high operating angle.

Thus, regarding the constant velocity universal joint provided with eight balls, when the thickness of the pillar portions is decreased more than that according to the present setting, it is impossible to sufficiently secure strength thereof at the time of a high operating angle. Therefore, it is difficult to aim at further compactification.

In this context, in recent years, regarding the fixed type constant velocity universal joint provided with six balls, there has been proposed one in which downsizing thereof is achieved and torque load capacity is increased. That is, balls as large as possible are planned to be arranged on a PCD as small as possible. However, when large balls are used, pillars (window pillar) between the pockets of the cage are narrowed so that rigidity of the cage is decreased. In particular, breakage of the cage is liable to be caused by twisting torque load at the time of a high angle, which leads to deterioration in strength of the constant velocity universal joint.

Further, when the track offset amounts of the inner and outer joint members are large and the offset amount of the cage is small, the depth of the track grooves on the inner side of the outer joint member is decreased and the torque load capacity at the time of a high angle is decreased. That is, against the torque load at the time of a high angle, the balls are liable to climb onto the track edges, and hence excessive stress is generated on the edge portions. Therefore, damages are caused by chips of the edge portions, and a locking phenomenon with respect to the cage occurs in accordance with generation of plastic deformation. Those damages and locking phenomenon lead to deterioration in operability, decrease in lifespan, and the breakage of the cage. Further, in the inner joint member also, the depth of the track on the inner side is decreased, and there are involved disadvantages as those in the outer joint member. Thus, conventional attempts have been made to enhance joint strength and durability in a region of a high angle.

In this context, there has been conventionally provided a constant velocity joint in which circumferential dimensions of pillar portions existing between pockets adjacent to each other in a circumferential direction are increased for securing durability of the cage, whereby the entire durability of the constant velocity joint is enhanced (Patent Document 2). That is, in the constant velocity joint described in Patent Document 2, multiple balls are accommodated in one pocket, whereby intervals between the balls within the same pocket are reduced so as to increase the circumferential dimension of the pillar portions existing between the pockets adjacent to each other in the circumferential direction, and seven numbers or more of balls are assumed.

Further, there has been conventionally provided a universal joint in which two balls are accommodated in each pocket of a cage so as to suppress periodical fluctuations in moment during rotation (Patent Document 3). That is, in the universal joint described in Patent Document 3, all the pockets of the cage are formed as long windows with large circumferential intervals, and the circumferential length of one window pillar is increased.

CITATION LIST

Patent Literature

Patent Document 1: JP 3859264 B
Patent Document 2: JP 11-303882 A
Patent Document 3: GB 1537067 B

SUMMARY OF INVENTION

Technical Problem

In the constant velocity joint described in Patent Document 2, multiple balls are accommodated in one pocket so that circumferential dimensions of pillar portions existing between pockets adjacent to each other in a circumferential direction are increased for securing durability of the cage, whereby the entire durability of the constant velocity joint is enhanced. However, the constant velocity joint described in Patent Document 2 is designed on the premise that seven or more balls are provided. Thus, in the constant velocity joint provided with six balls, it is impossible to prevent reduction in load capacity at the time of a high operating angle, an increase in contact surface pressure between the inner joint member and the inner spherical surface of the cage, and the like.

Further, in the universal joint described in Patent Document 3, two balls are accommodated in each pocket of a cage so that the whole number of the pockets is decreased for increasing circumferential lengths of window pillars as in the case of Patent Document 2. Thus, in this case also, it is impossible to prevent reduction in load capacity at the time of a high operating angle, an increase in contact surface pressure between the inner joint member and the inner spherical surface of the cage, and the like.

Incidentally, as illustrated in FIG. 32, when the thickness of the cage is increased on the joint opening side, the rigidity of the cage is increased on the joint opening side. With this, it is possible to secure strength at the time of a high operating angle.

As illustrated in FIG. 32, when the inner joint member 6 is incorporated into the cage 8, in a state in which the inner joint member 6 is arranged such that the axial line thereof is perpendicular with respect to the axial line of the cage 8 (state in which inner joint member 6 is rotated by 90 degrees with respect to cage 8), a part 4A of the outer spherical surface 4 of the inner joint member 6 is dropped into the pocket 9 (9A) of the cage 8. In this state, the inner joint member 6 is inserted into the cage 8. After that, the inner joint member 6 is rotated by 90 degrees with respect to the cage 8. The axial line of the inner joint member 6 is accorded with the axial line of the cage 8 so that arrangement into a regular posture is achieved. This method is generally adopted.

Thus, when the inner joint member 6 is incorporated into the cage 8, as illustrated in FIG. 32, it is necessary to set a dimension B of the inner joint member 6 to be smaller than a faucet diameter A of the cage 8. That is, in order to secure the dimension B in the inner joint member 6, it is necessary to set the faucet diameter A to be larger. In this case, the dimension B of the inner joint member 6 represents a dimension between the bottom portion of a track groove 5A dropped into the pocket 9A and an opening edge 10 on the inner joint member insertion side of a track groove 5B opposite to the track groove 5 by 180 degrees.

Further, in order to facilitate insertion of the inner joint member 6 into the cage 8, cutout portions 11 rectangular in cross-section are provided on the outer spherical surface 4 of the inner joint member 6 as illustrated in FIG. 34, and cutout portions (chamfers) 12 are provided on the outer spherical surface 4 of the inner joint member 6 as illustrated in FIG. 35. In addition, it is necessary to provide the normal pockets 9 with circumferential intervals b and the long windows (long pockets) 13 with circumferential intervals a larger than those of the normal pockets 9 as illustrated in FIG. 33, or to provide faucet portions 14 for allowing incorporation of the inner joint member on the inner surface of one of the inlet portions of the cage 8 as illustrated in FIG. 36 so as to increase the diameter of the inlet portion.

On the outer joint member 3, in order to enhance incorporating properties of the cage 8, in which the inner joint member 6 is incorporated, into the outer joint member 3, in some cases, the chamfers 15 are formed on the opening portion of the outer joint member 3 as illustrated in FIG. 37.

However, provision of the cutout portions 11 as illustrated in FIG. 34 leads to reduction in load capacity of the inner joint member at the time of a high operating angle and the increase in contact surface pressure between the inner joint member and the inner spherical surface of the cage, and the increase in contact surface pressure between the inner joint member and the inner spherical surface of the cage is caused even with the chamfers 12 as illustrated in FIG. 35. Further, provision of the faucet diameters 14 for allowing incorporation of the inner joint member on the inner surface of one of the inlets as illustrated in FIG. 36 leads to deterioration in strength of the inlet side and the increase in contact surface pressure between the inner joint member and the inner spherical surface of the cage.

Large load is applied on the opening side of the pockets 9. As a countermeasure therefor, as illustrated in FIGS. 38 to 40, it is possible to form a thick portion 51 on the joint opening side, to form cutout portions 52 for allowing incorporation of the inner joint member (inner member) on the inner surface on the joint inner side, and to form a thin portion 53 on the joint inner side.

Regarding the incorporation of the inner joint member 6 into the cage 8, which is illustrated in FIGS. 38 to 40, the inner joint member 6 is fitted into the cage 8 from the cutout portions 52 for allowing incorporation as illustrated FIG. 41. That is, the cage 8 and the inner joint member 6 are arranged such that a central axis (axial line) L1 of the cage 8 is orthogonal to a central axis (axial line) L2 of the inner joint member 6, and then the inner joint member 6 is fitted into the cage 8. After that, the incorporation is completed by rotating the inner joint member 6 by 90 degrees.

However, in the cage illustrated in FIGS. 38 to 40, the thin portion 53 is formed on the joint inner side as described above. Therefore, the cage 8 is inferior in durability.

Further, as illustrated in FIGS. 42 to 44, the cutout portions 13 may be provided on the inner surface on the joint opening side of the cage 8 so as to increase thickness on the joint inner side. In this case also, the cage 8 and the inner joint member 6 are arranged such that the central axis L1 of the cage 8 is orthogonal to the central axis L2 of the inner joint member 6, and then the inner joint member 6 is fitted into the cage 8 from the cutout portions 13 as illustrated in FIG. 45. After that, the incorporation is completed by rotating the inner joint member 6 by 90 degrees.

However, in the cage illustrated in FIGS. 42 to 45, the spherical portions are omitted from the inner surface on the joint opening side, and hence contact area of the inner joint member 6 with respect to the outer spherical surface is reduced. Therefore, there is a risk of interfering smooth rotational movement as a constant velocity universal joint.

The present invention has been made in view of the above-mentioned problems. A first object of the present invention to provide a fixed type constant velocity universal joint capable of, without involving decreases in load capacity of the inner joint member (inner member) and in spherical area, increasing rigidity of the cage and stabilizing durability. A second object of the present invention is to provide a fixed type constant velocity universal joint capable of, even at the time of a high operating angle and of bearing large torque, being smoothly rotated, reducing load on the cage, and securing durability. A third object of the present invention to provide a fixed type constant velocity universal joint capable of being downsized, suppressing decrease in load capacity at the time of forming an operating angle even after being downsized, and enhancing strength at a high angle and durability by alleviating climbing of the balls onto the track edges at the time of a high angle.

Solution to Problems

A first fixed type constant velocity universal joint of the present invention comprises:
an outer member having an inner spherical surface in which multiple track grooves are formed;
an inner member having an outer spherical surface in which multiple track grooves are formed;
multiple balls interposed between the track grooves of the outer member and the track grooves of the inner member so as to transmit torque; and
a cage having pockets for accommodating the balls and interposed between the outer member and the inner member, the cage being provided with a more rigid structure, wherein:
the cage comprises four pockets including a pair of long pockets with large circumferential intervals and a pair of short pockets with small circumferential intervals;
the more rigid structure is constituted by shifting the pair of long pockets by 180 degrees along a circumferential direction and shifting the pair of short pockets by 180 degrees along the circumferential direction so that the long pockets and the short pockets are arranged alternately to each other along the circumferential direction, and by accommodating two of the balls in each of the large pockets and accommodating one of the balls in each of the small pockets; and
a cutout portion is provided to an inner end portion of at least one of the track grooves of the inner member.

According to the first fixed type constant velocity universal joint of the present invention, the number of window pillars between the pockets of the cage may be set to four, and hence it is possible to increase a circumferential length of each of the window pillars of the cage. With this, it is possible to increase rigidity of the window pillars. Further, the inner joint member is more easily incorporated into the cage owing to the provision of the long pockets.

Further, the cutout portion is provided to an inner end portion of at least one of the track grooves, and hence, at the time of incorporation of the inner member, it is possible to rotate the inner member from the cutout portion, to thereby reduce the rotating radius of the inner member. Thus, it is possible to secure a larger space between the inner faucet diameter of the cage and the inner member, thereby possible to set the faucet diameter of the cage to be smaller by that much.

A second fixed type constant velocity universal joint of the present invention comprises:
an outer member having an inner spherical surface in which multiple track grooves are formed;
an inner member having an outer spherical surface in which multiple track grooves are formed;
multiple balls interposed between the track grooves of the outer member and the track grooves of the inner member so as to transmit torque; and
a cage having pockets for accommodating the balls and interposed between the outer member and the inner member, the cage being provided with a more rigid structure, wherein:
the more rigid structure is constituted by offsetting a center curvature of the track grooves of the outer member and a center curvature of the track grooves of the inner member oppositely to each other in an axial direction by equal distances with respect to a joint center and offsetting a center curvature of an outer spherical surface of the cage and a center curvature of an inner spherical surface of the cage oppositely to each other in the axial direction by equal distances with respect to the joint center so that an offset amount of the cage is increased so as to be substantially equal to an offset amount of the track grooves; and
grooves are provided in a thick portion on a joint opening side of the cage at the same pitches at those of the pockets, the grooves being provided for enabling, in a state in which an axial line of the inner member and an axial line of the cage are accorded with each other, the inner member to be incorporated into the cage by allowing protruding portions between the track grooves adjacent to each other in a circumferential direction of the inner member to be fitted-in along the axial direction.

According to the second fixed type constant velocity universal joint of the present invention, the center curvature of the track grooves of the outer member and the center curvature of the track grooves of the inner member are offset oppositely to each other in the axial direction by the equal distances with respect to the joint center, and the center curvature of the outer spherical surface of the cage and the center curvature of the inner spherical surface of the cage are offset oppositely to each other in the axial direction by the equal distances with respect to the joint center so that the offset amount of the cage is increased so as to be substantially equal to the offset amount of the track grooves. With this, it is possible to prevent decrease in depth of the track grooves on the joint inner side, and to increase the thickness (radial thickness) of the cage on the opening side, thereby possible to achieve enhancement of rigidity of the cage.

Further, the grooves provided in the thick portion on the joint opening side of the cage enable incorporation of the inner member into the cage. Thus, on the joint inner side of the cage, it is possible to reduce the faucet diameter so as to secure a large inner spherical area on the joint inner side. Also on the joint opening side of the cage, it is unnecessary to form the cutout portion by eliminating the spherical portion. As a result, the area of the spherical portion can be secured.

A third fixed type constant velocity universal joint of the present invention comprises:

an outer member having an inner spherical surface in which multiple track grooves are formed;

an inner member having an outer spherical surface in which multiple track grooves are formed;

multiple balls interposed between the track grooves of the outer member and the track grooves of the inner member so as to transmit torque; and a cage having pockets for accommodating the balls and interposed between the outer member and the inner member, the cage being provided with a more rigid structure, wherein:

the more rigid structure is constituted by setting the number of the balls to six; and a ratio between a pitch circle diameter of the balls and a diameter of the balls is set to 3.0 or larger and 3.3 or smaller.

According to the third fixed type constant velocity universal joint of the present invention, the number of the balls is six, and hence it is possible to use relatively large balls and in addition, to increase width of pillar portions between the pockets of the cage. With this, it is possible to enhance rigidity of the cage. By setting the ratio between the pitch circle diameter of the balls and the diameter of the balls to 3.0 or larger and 3.3 or smaller, it is possible to secure strength and durability as a constant velocity universal joint.

When the ratio between the pitch circle diameter and the diameter of the balls is represented by $r1$, and $r1<3.0$ is established, the thickness of the inner member is excessively small in the case where the diameter of the balls is excessively large, which leads to a concern over strength. The surface pressure between the inner member (inner joint member) and the outer member (outer joint member), and the balls is increased in the case where the pitch circle diameter of the balls is small, which leads to a concern over durability. In contrast, when $r1>3.3$ is established, the load capacity of the balls is decreased in the case where the diameter of the balls is small, which leads to a concern over durability. The outer diameter of the outer member is increased in the case where the pitch circle diameter of the balls is large. As a result, it is impossible to achieve compactification.

In the first fixed type constant velocity universal joint and the second fixed type constant velocity universal joint, it is preferred that a center curvature of the track grooves of the outer member and a center curvature of the track grooves of the inner member be offset oppositely to each other in an axial direction by equal distances with respect to a joint center, and a center curvature of an outer spherical surface of the cage and a center curvature of an inner spherical surface of the cage be offset oppositely to each other in the axial direction by equal distances with respect to the joint center so that an offset amount of the cage is increased so as to be substantially equal to an offset amount of the track grooves. With this, it is possible to prevent decrease in depth of the track grooves on the joint inner side, and to increase the thickness (radial thickness) of the cage on the opening side.

In the second fixed type constant velocity universal joint and the third fixed type constant velocity universal joints, it is preferred that: the pockets of the cage comprise four pockets including a pair of long pockets with large circumferential intervals and a pair of short pockets with small circumferential intervals; the pair of long pockets be shifted by 180 degrees along a circumferential direction, and the pair of short pockets be shifted by 180 degrees along the circumferential direction so that the long pockets and the short pockets are arranged alternately to each other along the circumferential direction; and two of the balls be accommodated in each of the large pockets and one of the balls be accommodated in each of the small pockets.

Further, in the first fixed type constant velocity universal joint, it is preferred that: a pitch angle on a PCD between the two balls accommodated in each of the long pockets be set to be lower than 60 degrees; and a pitch angle between other balls be set to be higher than 60 degrees. With this, the inter-pitch distance of the two balls accommodated in each of the long pockets is reduced, and correspondingly, the inter-pitch distance of the track grooves of the outer member is reduced.

In the first fixed type constant velocity universal joint, it is preferred that an axial length of the inner member be smaller than the circumferential intervals of the long pockets. With this, the inner member can be more easily incorporated into the cage. Further, it is also preferred that a shoulder width dimension of two of the track grooves of the outer member be set to be smaller than a pocket width in an axial direction of the cage, the two of the track grooves corresponding to each of the long pockets of the cage. With this, the cage can be more easily incorporated into the outer joint member.

A swell portion swelling on an inner side of each of the long pockets is provided on at least one of longitudinal sides, which face each other, of each of the long pockets, and hence two ball accommodating portions can be communicatingly provided through an intermediation of a slit in each of the long pockets.

Examples of the fixed type constant velocity universal joint include one in which the track groove bottoms of the inner member and the outer member are provided with circular-arc portions and straight portions, and one in which the track groove bottoms of the inner member and the outer member are provided with circular-arc portions and tapered portions.

It is preferred that a ratio between an outer diameter of the outer member and the diameter of the balls be set to 4.6 or larger and 4.8 or smaller. When the ratio between the outer diameter of the outer member and the diameter of the balls is represented by $r2$, and $r2<4.6$ is established, the thickness of the outer member is excessively small in the case where the diameter of the balls is excessively large, which leads to a concern over strength. The surface pressure between the inner member and the outer member, and the balls is increased in the case where the outer diameter of the outer member is small, which leads to a concern over durability. In contrast, when r2>4.8 is established, the load capacity of the balls is decreased in the case where the diameter of the balls is small, which leads to a concern over durability. As a result, it is impossible to achieve compactification in the case where the outer diameter of the outer member is large.

Further, it is preferred that the cutout portion be provided to the inner end portion of the at least one of the track grooves of the inner member. With the provision of the cutout portion, at the time of incorporation of the inner member, it is possible to rotate the inner member from the cutout portion, to thereby reduce the rotating radius of the inner member. Thus, it is possible to secure a larger space between the inner faucet diameter of the cage and the inner member, thereby possible to set the faucet diameter of the cage to be smaller by that much.

Advantageous Effects of Invention

In the first invention, it is possible to increase rigidity of each of the window pillars of the cage. Thus, large balls can be arranged on a small PCD, and compactification can be achieved without decreasing load capacity. In addition, it is possible to prevent breakage of the cage, which is caused by twisting torque load at the time of a high angle. Further, provision of the long pockets facilitates incorporation of the inner member (inner joint member) into the cage. In particular, when the axial length of the inner joint member is smaller than the minimum length of the circumferential intervals of the long pockets, the inner joint member can be more easily incorporated into the cage. As a result, working properties at the time of assembly can be enhanced.

Further, in the first invention, the cutout portion is provided to the inner end portion of at least one of the track grooves, whereby it is possible to set the faucet diameter of the cage to be smaller. With this, it is possible to increase a sectional area on the faucet side of the cage, and to enhance rigidity of a thin outer frame portion of the cage. Further, it is possible to prevent an increase in surface contact pressure and to avoid generation of heat and a decrease in durability. In addition, it is possible to avoid deformation of the cage and a decrease in strength. That is, it is possible to enhance rigidity of the cage without decreasing load capacity of the inner member and the spherical area. Further, it is possible to increase the area of the inner spherical surface of the cage, and hence possible to increase the contact area with respect to the outer spherical surface of the inner member (inner joint member). Thus, there is an advantage of stable durability in addition to enhancement of rigidity.

In the second invention, the offset amount of the cage is increased so as to be substantially equal to the offset amount of the track grooves, thereby making it possible to prevent decrease in depth of the track grooves on the joint inner side, and also making it possible to increase the thickness (radial thickness) of the cage on the joint opening side. For that reason, it is possible to prevent the balls at the time of a high angle from climbing onto the track edges, with the result that excessive stress does not apply on the edges. That is, it is possible to prevent decrease in twisting torque load capacity at the time of a high angle, to achieve enhancement (improvement) of lifespan at the time of a high angle, and to achieve enhancement (improvement) of resistance against breakage caused by the plastic deformation of the track grooves of the inner joint member and the outer joint member at the time of a high angle.

Further, in the second invention, on the joint inner side of the cage, it is possible to reduce the faucet diameter so as to secure a large inner spherical area on the joint inner side, thereby possible to increase durability of the cage. Also on the joint opening side of the cage, it is unnecessary to form the cutout portion by eliminating the spherical portion. As a result, the area of the spherical portion can be secured, whereby smooth rotation is realized. In addition, after the inner member is fitted into the cage, it is unnecessary to rotate the inner member by 90 degrees. Thus, there is an advantage of simplifying an assembly operation.

In the third invention, the relatively large balls can be used, and hence the allowable torque capacity of one ball can be secured, and the balls can be arranged in a small PCD, that is, the outer diameter can be downsized. In addition, the thickness of the pillar portions between the pockets of the cage can be also increased, and hence the strength at the time of a high operating angle can be secured.

Further, in the third invention, the ratio between the pitch circle diameter of the balls and the diameter of the balls is set to 3.0 or larger and 3.3 or smaller. As a result, it is possible to secure strength and durability as a constant velocity universal joint, and possible to provide a high-precision constant velocity universal joint.

DETAILED DESCRIPTION OF THE INVENTION

Description of a fixed type constant velocity universal joint according to embodiments of the present invention is given with reference to FIGS. 1 to 27.

Figure 1:
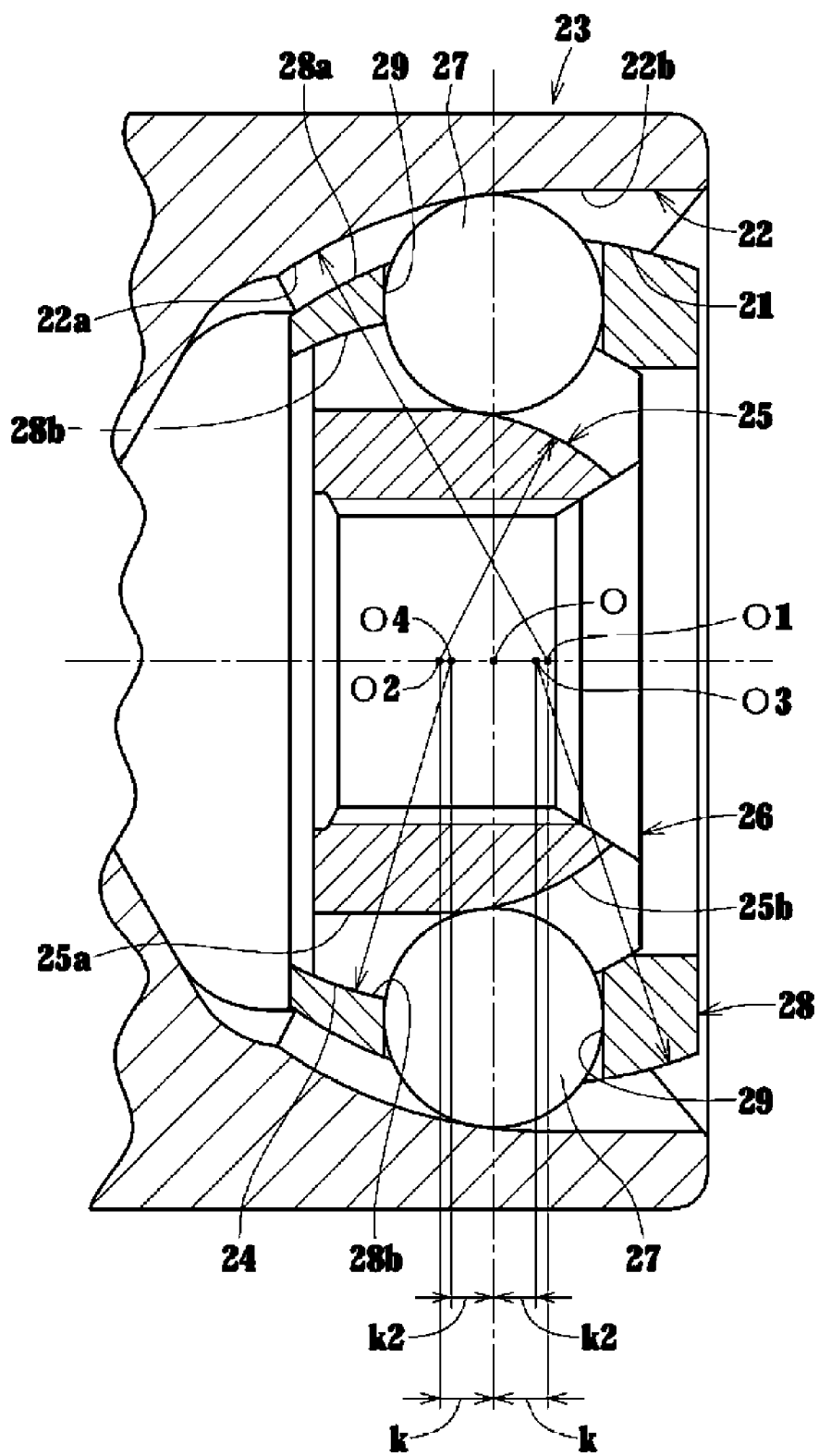
FIG. 1 is a longitudinal cross-sectional view illustrating a fixed type constant velocity universal joint according to a first embodiment of the present invention.
Figure 2:
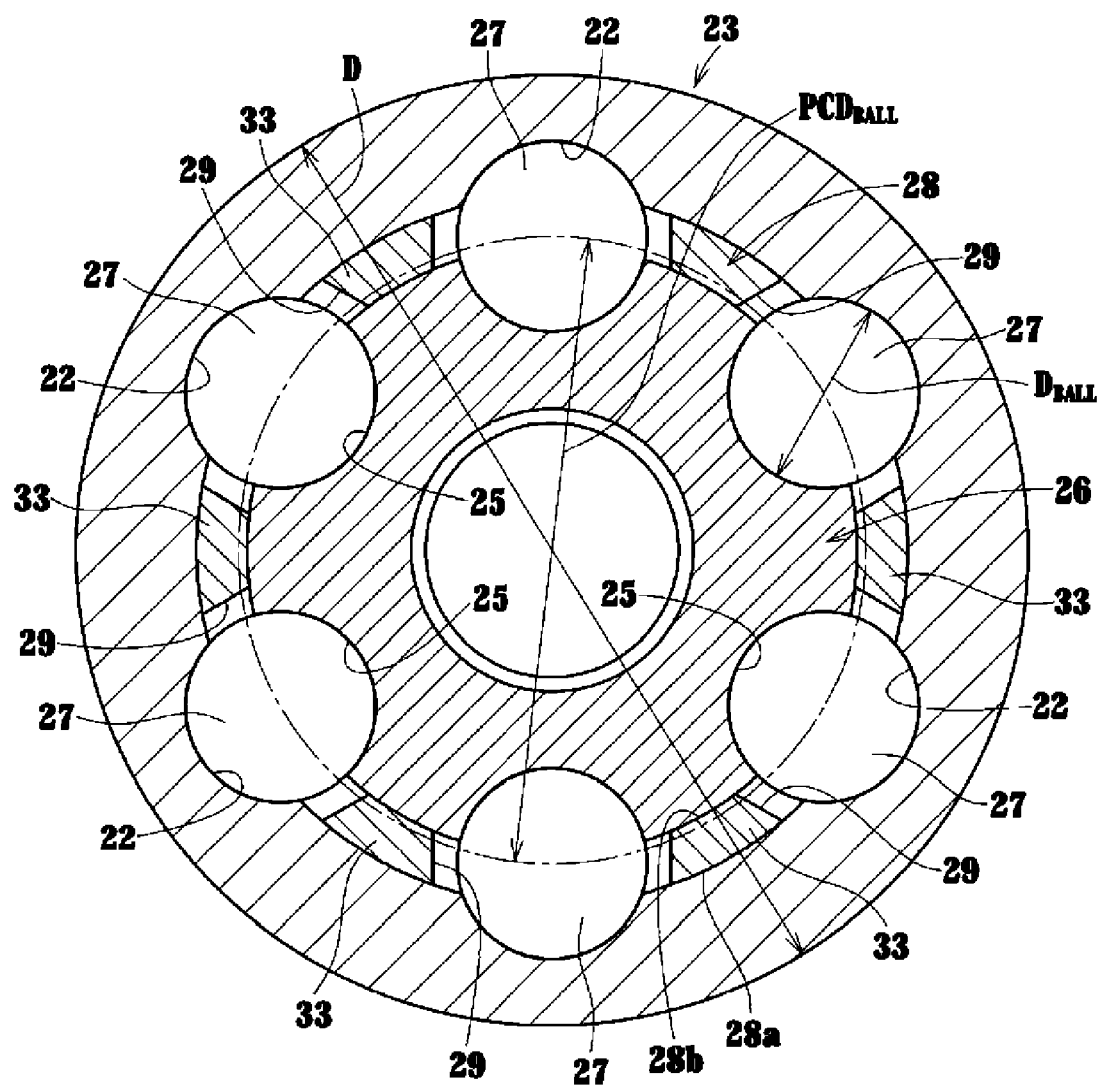
FIG. 2 is a lateral cross-sectional view illustrating the fixed type constant velocity universal joint.

The fixed type constant velocity universal joint according to a first embodiment adopts an undercut free type, and, as illustrated in FIG. 1, includes an outer joint member 23 that functions as an outer member in which multiple (six) track grooves 22 are formed on an inner spherical surface 21 along the axial direction at irregular intervals in the circumferential direction, an inner joint member 26 that functions as an inner member in which multiple (six) track grooves 25 that are paired with the track grooves 22 of the outer joint member 23 are formed on an outer spherical surface 24 along the axial direction at irregular intervals in the circumferential direction, multiple (six) balls 27 that are interposed between the track grooves 22 of the outer joint member 23 and the track grooves 25 of the inner joint member 26 to transmit torque, and a cage 28 including pockets 29 which are interposed between the inner spherical surface 21 of the outer joint member 23 and the outer spherical surface 24 of the inner joint member 26 to retain the balls 27. In this case, as illustrated in FIG. 2, six pockets 29 are arranged at regular pitches (60 degree pitches) along the circumferential direction.

Each of the track grooves 22 of the outer joint member 23 includes an inner side track groove 22*a* in which the track groove bottom is a circular-arc portion, and an opening side track groove 22*b* in which the track groove bottom is a straight portion that is in parallel to the axial line of the outer joint member. The inner side track groove 22*a* has a center curvature O1 offset toward the opening side of the outer joint member 23 from a joint center O in an axial direction. Further, each of the track grooves 25 of the inner joint member 26 includes an inner side track groove 25*a* in which the track groove bottom is a straight portion which is in parallel to the axial line of the inner joint member, and an opening side track groove 25*b* in which the track groove bottom is a circular-arc portion. A center curvature O2 of the opening side track grooves 25*b* is separated from the joint center O by an equal distance k toward the inner side opposite to the center curvature O1 of the inner side track groove 22*a* of the outer joint member 23 in the axial direction.

The cage 28 offsets a center curvature O3 of the outer spherical surface 28*a* and a center curvature O4 of the inner spherical surface 28*b* with respect to the joint center (cage center) O by equal distances k2 oppositely to each other in the axial direction so that the offset amount of the cage 28 is increased so as to be substantially equal to the offset amount of the track grooves.

For that reason, the outer spherical surface 28a of the cage 28 is capable of forming a circular-arc portion (concentric circular-arc portion different in the radius curvature) that is substantially concentric with the groove bottom of the inner side track grooves 22a of the outer joint member 23, thereby making it possible to prevent the track groove depth on the joint inner side from being decreased, and also to increase the thickness (radial thickness) of the opening side of the cage 28.

As illustrated in FIG. 2, it is assumed that a ratio r1 between the pitch circle diameter $PCD_{BALL}$ of the balls 27 and a diameter $D_{BALL}$ of the balls 27 is set to 3.0 or larger and 3.3 or smaller. That is, $3.0 \leq r1 \leq 3.3$ is established. It is assumed that a ratio r2 between the outer diameter $D_{OUTER}$ of the outer joint member 23 and the diameter $D_{BALL}$ of the balls 27 is set to 4.6 or larger and 4.8 or smaller. That is, $4.4 \leq r2 \leq 4.8$ is established.

Herein, the pitch circle diameter $PCD_{BALL}$ is obtained by 2×(a length of a line connecting the center of the track grooves of the outer joint member or the center of the track grooves of the inner joint member and the centers of the balls), and represents a diameter of a circular trace which is obtained by connecting the centers of the balls.

In the present invention, the number of the balls 27 is six, and hence it is possible to use relatively large balls 27 and in addition, to increase thickness of pillar portions 33 between the pockets 29 of the cage 28. With this, the cage 28 can be provided with a more rigid structure. By setting the ratio between the pitch circle diameter of the balls 27 and the diameter of the balls to 3.0 or larger and 3.3 or smaller, it is possible to secure strength and durability as a constant velocity universal joint.

When the ratio between the pitch circle diameter and the diameter of the balls 27 is represented by r1, and r1<3.0 is established, the thickness of the inner joint member 26 is excessively small in the case where the diameter of the balls is excessively large, which leads to a concern over strength. The surface pressure between the inner and outer joint members 26 and 23 and the balls is increased in the case where the pitch circle diameter of the balls is small, which leads to a concern over durability. In contrast, when r1>3.3 is established, the load capacity of the balls 27 is decreased in the case where the diameter of the balls 27 is small, which leads to a concern over durability. The thickness of the outer joint member 23 is excessively small in the case where the pitch circle diameter of the balls 27 is large, which leads to a concern over strength or leads to an increase in outer diameter of the outer joint member. As a result, it is impossible to achieve compactification.

It is preferred that a ratio between the outer diameter of the outer joint member 23 and the diameter of the balls 27 be set to 4.6 or larger and 4.8 or smaller. When the ratio between the outer diameter of the outer joint member 23 and the diameter of the balls 27 is represented by r2, and r2<4.6 is established, in the case where the diameter of the balls 27 is large, the thickness of the outer joint member 23 is excessively small, which leads to a concern over strength. When the outer diameter of the outer joint member 23 is small, the surface pressure between the inner and outer joint members 26 and 23 and the balls is increased, which leads to a concern over durability. In contrast, when r2>4.8 is established, in the case where the diameter of the balls 27 is small, the load capacity of the balls is smaller, which leads to a concern over durability. When the outer diameter of the outer joint member 23 is large, it is impossible to achieve compactification.

Further, in the present invention, the center curvature O1 of the track grooves 22 of the outer joint member 23 and the center curvature O2 of the track grooves 25 of the inner joint member 26 are offset oppositely to each other in the axial direction by equal distances with respect to the joint center O, and the center curvature O3 of the outer spherical surface 28a of the cage 28 and the center curvature O4 of the inner spherical surface 28b of the cage 28 are offset oppositely to each other in the axial direction by equal distances with respect to a joint center O. The offset amount of the cage 28 is increased so as to be substantially equal to the offset amount of the track grooves 22 and 25. As described above, in the present invention, the offsets of the track grooves 22 and 25 are set to be small, and the offset amount of the cage 28 is set to be large. Thus, it is possible to prevent decrease in depth of the track grooves on the joint inner side, and to increase the thickness (radial thickness) of the cage 28 on the opening side. With this, the cage 28 can be provided with the more rigid structure. Therefore, it is possible to prevent the balls 27 at the time of a high angle from climbing onto the track edges, with the result that excessive stress does not apply on the edges. That is, it is possible to prevent decrease in twisting torque load capacity at the time of a high angle, to achieve enhancement (improvement) of lifespan at the time of a high angle, and to achieve enhancement (improvement) of resistance against breakage caused by the plastic deformation of the track grooves 22 and 25 of the outer joint member 22 and the inner joint member 26.

Figure 3:
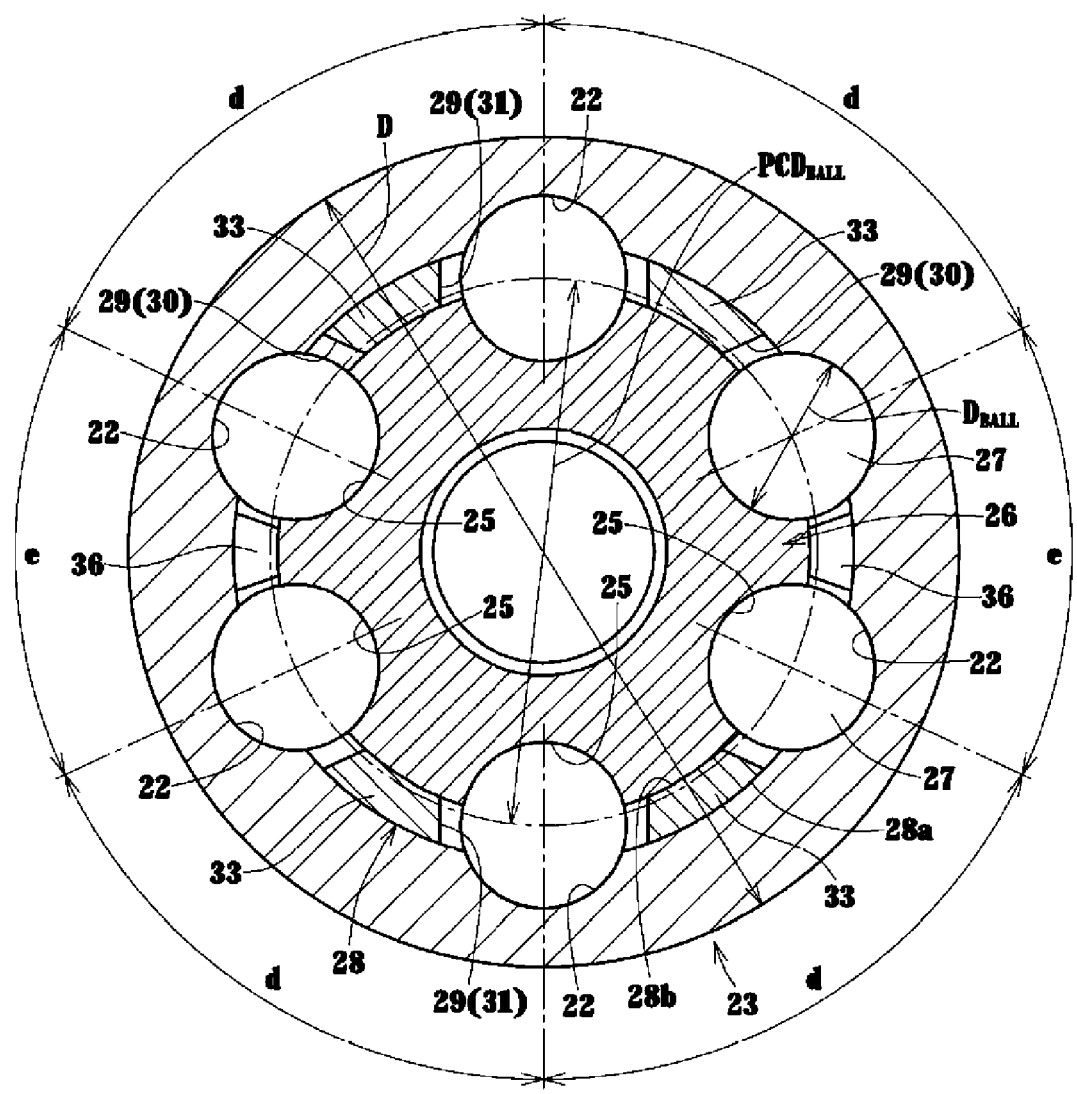
FIG. 3 is a lateral cross-sectional view illustrating a fixed type constant velocity universal joint according to a second embodiment of the present invention.

FIG. 3 illustrates a second embodiment, and the cage 28 in this case includes four pockets including a pair of long pockets 30 with large circumferential intervals, and a pair of short pockets 31 with small circumferential intervals. Then, the pair of long pockets 30 are shifted along the circumferential direction by 180 degrees, and the pair of short pockets 31 are shifted along the circumferential direction by 180 degrees, so as to alternately provide the long pockets 30 and the short pockets 31 along the circumferential direction. Therefore, the number of pillar portions (cage pillar portions) 33 which are provided between the pockets is four. Then, each of the long pockets 30 accommodates two balls 27, and each of the short pockets 31 accommodates one ball 27.

Figure 4:
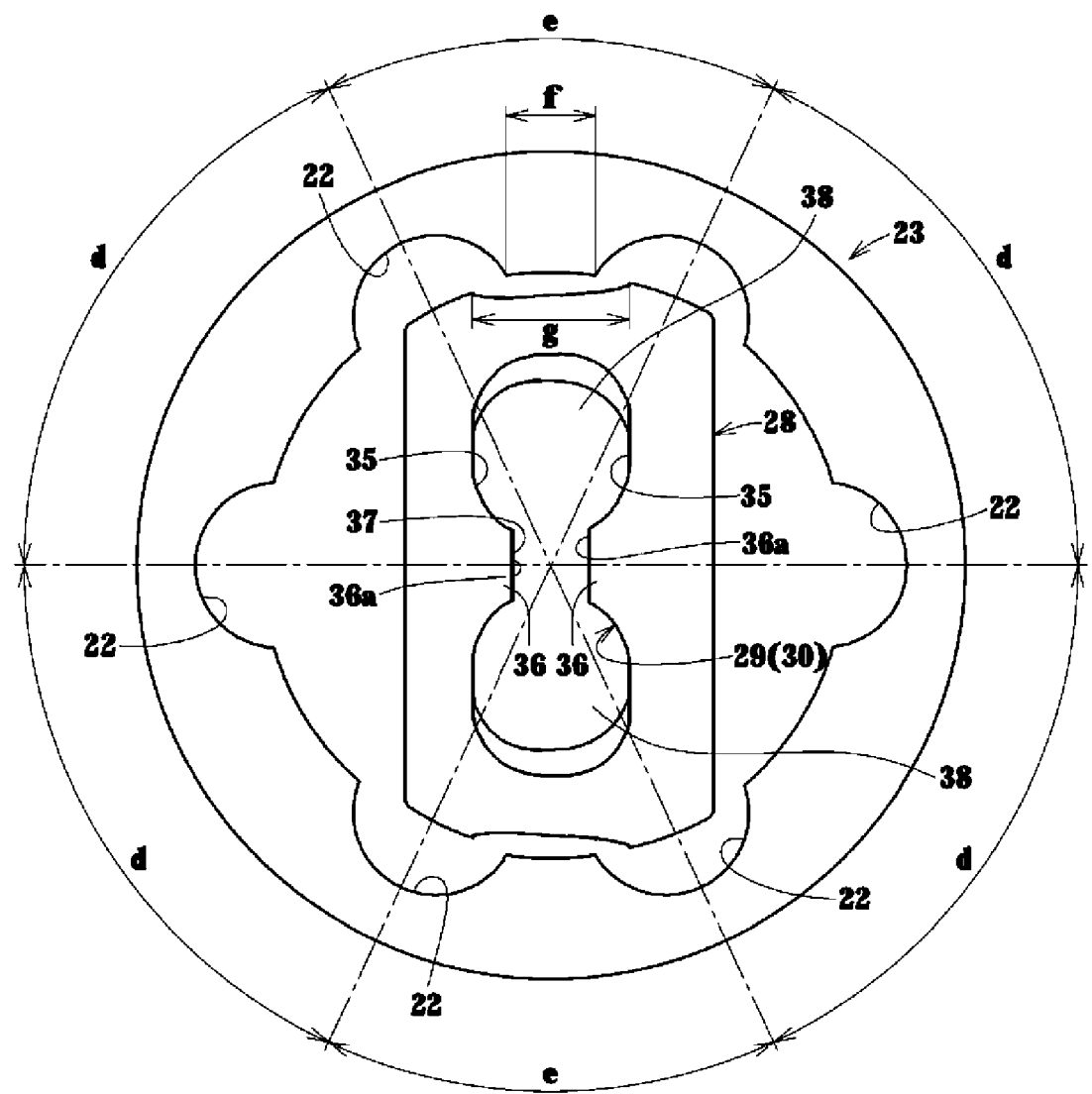
FIG. 4 is a front view illustrating a relationship between an outer joint member and a cage of the fixed type constant velocity universal joint illustrated in FIG. 3.

Pitch angles e of two balls 27 which are accommodated in each of the long pockets 30 on the PCD are made smaller than 60 degrees, and pitch angles d of other balls 27 are made larger than 60 degrees. For that reason, as illustrated in FIG. 4, a shoulder width dimension f between two track grooves of the outer joint member 23 corresponding to the long pocket 30 of the cage 28 is set to be smaller than a pocket width g in the axial direction of the cage. Further, as illustrated in FIG. 5, an axial length i of the inner joint member 26 is shorter than a circumferential interval h of the long pocket 30.

Figure 5:
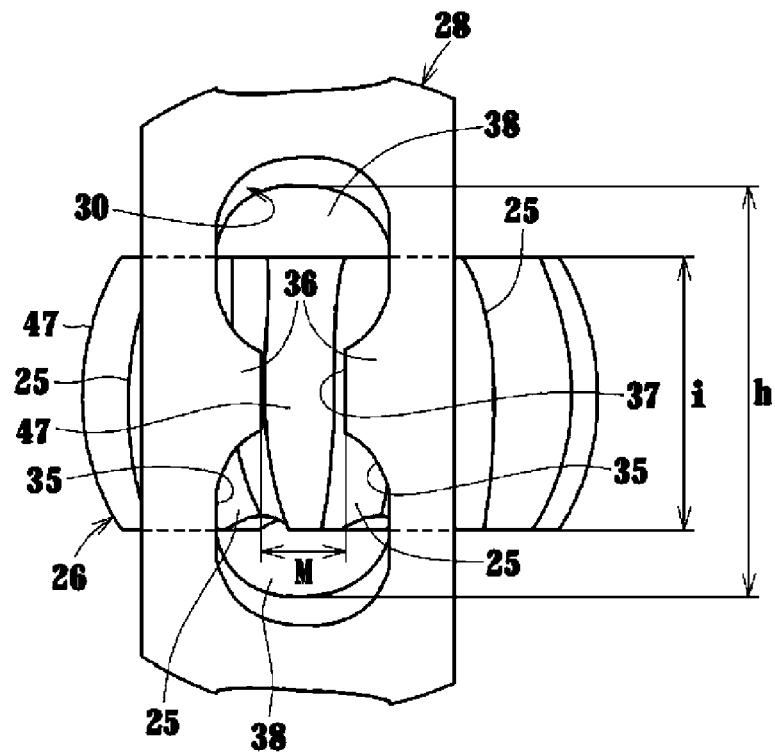
FIG. 5 is a side view illustrating a relationship between an inner joint member and the cage of the fixed type constant velocity universal joint illustrated in FIG. 3.

Incidentally, as illustrated in FIGS. 4 and 5, swell portions 36 and 36 swelling on an inner side of each of the long pockets are provided in the centers of the longitudinal direction at opposed long sides 35a and 35b of the long pocket 30 in the long pocket 30 to form two ball accommodating portions 38 and 38 which are communicatingly provided to the long pocket 30 through an intermediation of a slit 37. Further, the outer surfaces of the swell portions 36 and 36 are continuous spherical surfaces having the same radius curvature as that of the outer spherical surface 28a of the cage 28, and the inner surfaces of the swell portions 36 and 36 are continuous spherical surfaces having the same radius curvature as that of the inner spherical surface 28b of the cage 28. In this embodiment, the configuration of the swell portion 36 is a trapezoidal shape whose sides are circular arc surfaces when viewed from the cage outer circumferential side. For that reason, protruding end surfaces 36a of the respective swell portions 36 are flat surfaces that extend along the cage circumferential direction, and face (are opposed to) each other at predetermined intervals M.

As illustrated in FIG. 5, the predetermined interval M is a dimension that does not interfere with a shoulder portion 47 (protruding portion between the adjacent track grooves) of the inner joint member 26 at the time of assembly. Further, the size and configuration of the swell portions 36 must be designed so as not to inhibit the motion of the balls 27 that are accommodated in the ball accommodating portion 38, for example, when the joint rotates with an operating angle. The swell portions 36 can be formed through machine working or plastic working when the long pockets 30 are formed.

As described above, the cage 28 includes four pockets including the pair of long pockets 30 with large circumferential intervals, and the pair of short pockets 31 with small circumferential intervals. Further, the pair of long pockets 30 are shifted along the circumferential direction by 180 degrees, and the pair of short pockets 31 are shifted along the circumferential direction by 180 degrees, so as to alternately provide the long pockets 30 and the short pockets 31 along the circumferential direction. With the above-mentioned configuration, the number of pillar portions 33 which are provided between the pockets of the cage 28 can be set to four, and the circumferential length of one pillar portion 33 can be increased.

Figure 6:
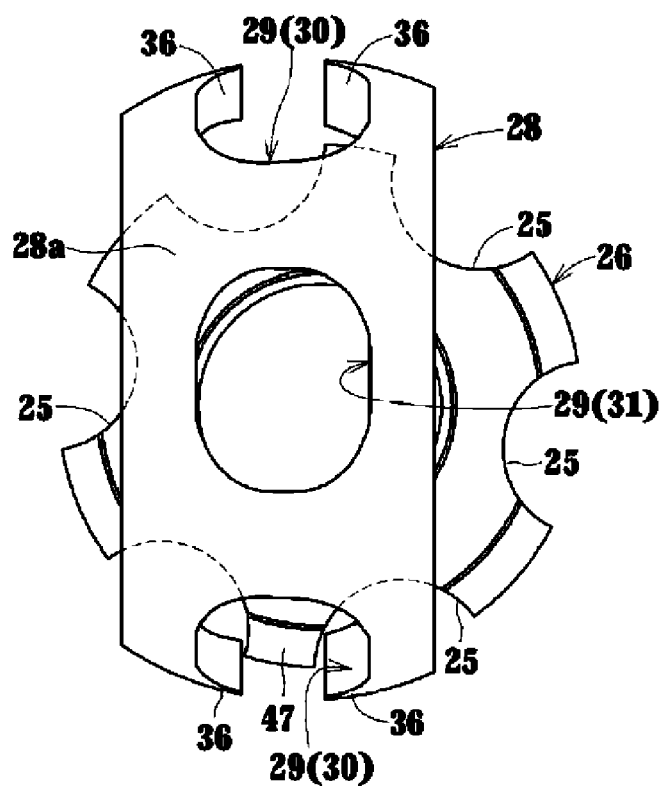
FIG. 6 is a side view illustrating a state in which the inner joint member is incorporated into the cage in the fixed type constant velocity universal joint illustrated in FIG. 3.

As a result, the rigidity of the respective cage pillar portions 33 can be enhanced (the cage 28 can be provided with a more rigid structure), and hence the large balls 27 can be arranged in the small PCD, and downsizing can be conducted as the fixed type constant velocity universal joint that can achieve compactification without deteriorating the load capacity. Further, it is possible to prevent breakage of the cage 28, which is caused by the twisting torque load at the time of a high angle. Further, provision of the long pockets 30 facilitates incorporation of the inner joint member 26 into the cage 28. That is, the incorporation of the inner joint member 26 into the cage 28 is, as illustrated in FIGS. 5 and 6, conducted by dropping one shoulder portion 47 of the inner joint member 26 in one long pocket 30. Therefore, the long pocket 30 is used for the pocket 29 into which the shoulder portion 47 is dropped, thereby being capable of improving the operability.

Provision of the long pockets 30 facilitates incorporation of the inner joint member 26 into the cage 28. In particular, setting of the axial length of the inner joint member 26 to be shorter than the minimum length of the circumferential intervals of the long pockets 30 further facilitates incorporation of the inner joint member 26 into the cage 28. As a result, it is possible to enhance assembly operability.

Note that, when the two balls 27 are accommodated in each of the long pockets 30, it is necessary to increase rigidity of the cage on the joint opening side subjected to large load from the balls 27 because the window pillar 33 does not exist between the balls. However, as described above, the offset amount of the cage 28 is increased so as to be substantially equal to the offset amount of the track grooves 22 and 25, whereby it is possible to increase rigidity of the cage on the joint opening side. Therefore, even with the structure in which the two balls 27 are accommodated in each of the long pockets 30, it is possible to sufficiently maintain the strength of the cage 28.

Further, it is possible to increase the thickness (radial thickness) of the cage on the joint opening side, and hence is possible to increase rigidity of the pillar frame of the cage on the joint opening side. Thus, in combination with the increase in rigidity of the window pillars of the cage, it is possible to greatly enhance the resistance against breakage of the cage to be caused by twisting torque load at the time of a high angle.

In the fixed type constant velocity universal joint of FIG. 3, the track grooves 25 of the inner joint member 26 and the track grooves 22 of the outer joint member 23 are arranged at irregular intervals in the circumferential direction. In this case, the pockets of the cage 28 are also arranged at irregular intervals in the circumferential direction. With this, when the inner joint member is incorporated into the cage 28, the pockets 30 each having a long circumferential length at the time of assembly can be utilized, which leads to enhancement of assembly properties.

Provision of the swell portions 36 and 36 in the long pocket 30 makes it possible to improve the rigidity of a frame for constituting the long pocket 30. As a result, the cage 28 can be prevented from being deformed due to the shortage of the rigidity, the operation property of the joint is not impaired, and the operation property that is stable for a long period of time can be exerted.

Further, an interference of the faucet edge portion of the opening (inlet portion) of the outer joint member 23 with the pocket edge portion of the cage outer spherical surface 28a side can be delayed or eliminated by the swell portion 36 of the long side 35a side at the joint opening side when the operating angle is taken. An interference of the inner side edge portion of the outer spherical surface 24 of the inner joint member 26 with the pocket edge portion of the cage inner spherical surface 28b side can be delayed or eliminated by the swell portion 36 of the long side 35b of the joint inner side. For that reason, the cage 28 is easily guided to the inner spherical surface 21 of the outer member or the outer spherical surface 24 of the inner member, the operation property of the joint can be prevented from being deteriorated, and the crack or breakage of the cage 28 can be effectively prevented together with the prevention of the deterioration of the operation property of the joint due to an improvement in the rigidity.

It is possible to reduce the inter-pitch distance of the two balls 27 accommodated in each of the long pockets 30, and correspondingly, it is possible to reduce the inter-pitch distance of the track grooves 22 of the outer joint member 23. With this, it is possible to facilitate incorporation of the cage 28 into the outer joint member 23. In particular, the inter-pitch distance (inter-track groove shoulder width dimension f) can be reduced with respect to the pocket width g in the axial direction of the cage. With this, it is possible to further facilitate incorporation of the cage 28 into the outer joint member 23, which leads enhancement of assembly operability.

Figure 7A:
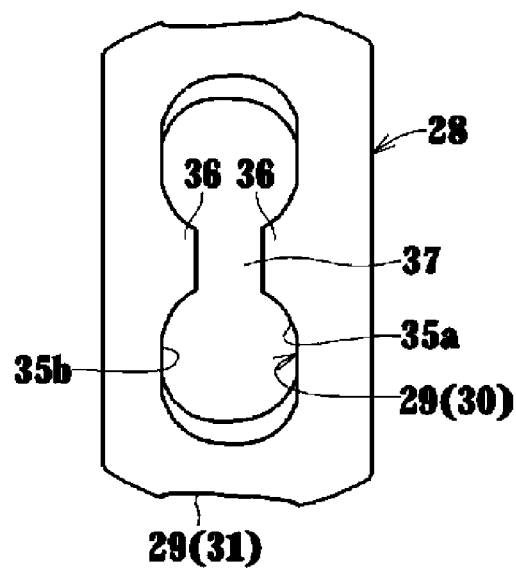
FIG. 7A is a side view illustrating the cage of the fixed type constant velocity universal joint illustrated in FIG. 3.
Figure 7B:
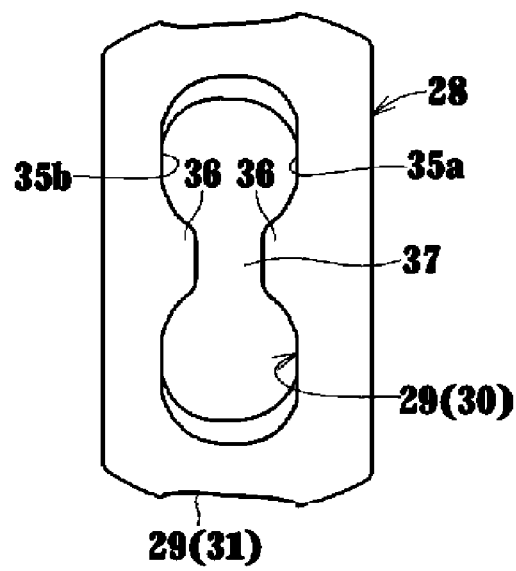
FIG. 7B is a side view illustrating a cage according to a first modification.
Figure 7C:
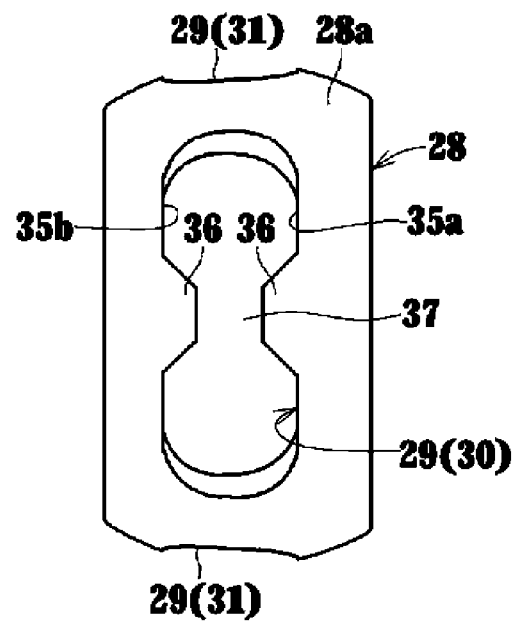
FIG. 7C is a side view illustrating a cage according to a second modification.
Figure 7D:
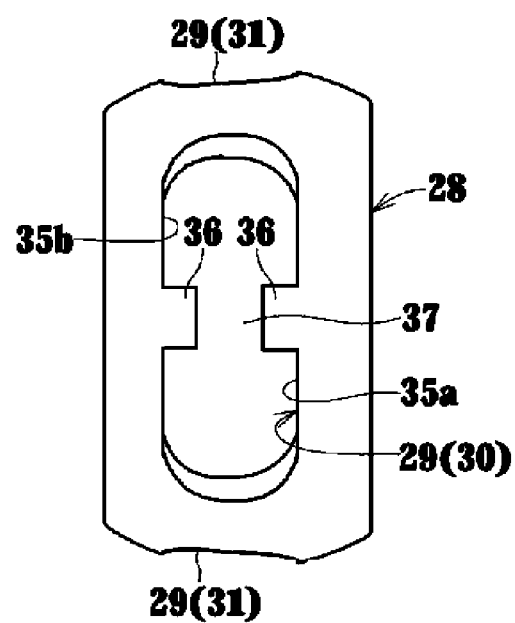
FIG. 7D is a side view illustrating a cage according to a third modification.

The long pocket 30 according to the above-mentioned embodiment has the swell portions 36 and 36 that are of the so-called trapezoidal configuration as illustrated in FIG. 7A. Alternatively, the swell portions 36 and 36 may be of the configurations as illustrated in FIGS. 7B, 7C, and 7D. That is, in the swell portions 36 and 36 of FIG. 7B, the corner portions of the protruding end surfaces 36a of the swell portions 36 are of an R-shape. The swell portions 36 and 36 of FIG. 7C are of a trapezoidal configuration in which base portions of the corner portions are not smooth, and the swell portions 36 and 36 of FIG. 7D are of a rectangular configuration.

The cages 28 having the long pockets 30 that are configured as illustrated in FIGS. 7B, 7C, and 7D have the same effects as that of the cage 28 of FIG. 7A.

Figure 8A:
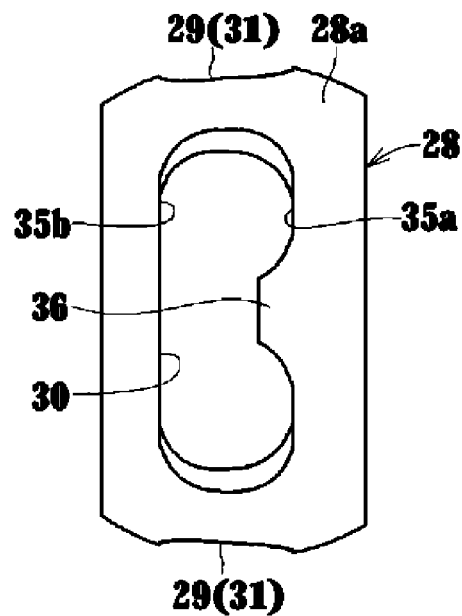
FIG. 8A is a side view illustrating a cage according to a fourth modification.
Figure 8B:
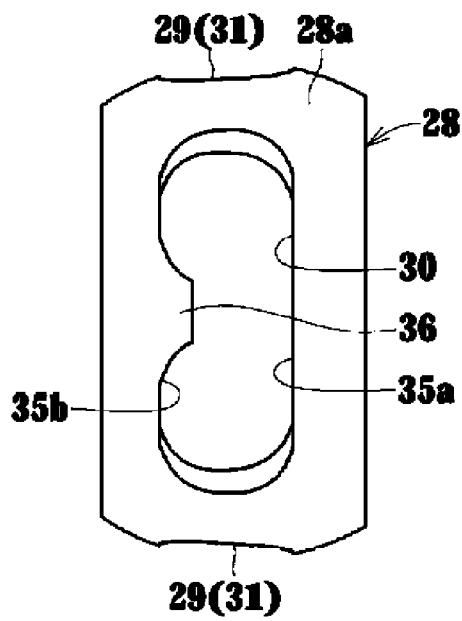
FIG. 8B is a side view illustrating a cage according to a fifth modification.

Further, as illustrated in FIGS. 5A and 8B, any one of the pair of swell portions 36 and 36 can be omitted. In FIG. 8A, the swell portion 36 is provided on only the long side 35a side of the joint opening portion side, and in FIG. 8B, the swell portion 36 is provided on only the long side 35b side of the joint opening portion side.

That is, in the configuration illustrated in FIG. 5A, an interference of the inner low edge portion of the opening (inlet portion) of the outer joint member 23 with the pocket edge portion of the cage outer spherical surface 28a side can be delayed or eliminated. In the configuration illustrated in FIG. 8B, an interference of the inner side edge portion of the outer spherical surface 24 of the inner joint member 26 with the pocket edge portion of the cage inner spherical surface 28b side can be delayed or eliminated.

Figure 9:
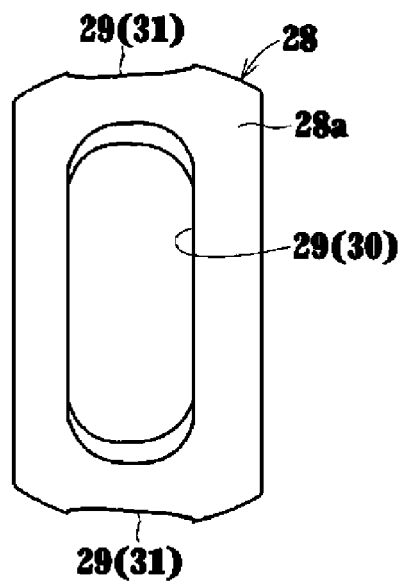
FIG. 9 is a side view illustrating a cage according to a sixth modification.
Figure 10:
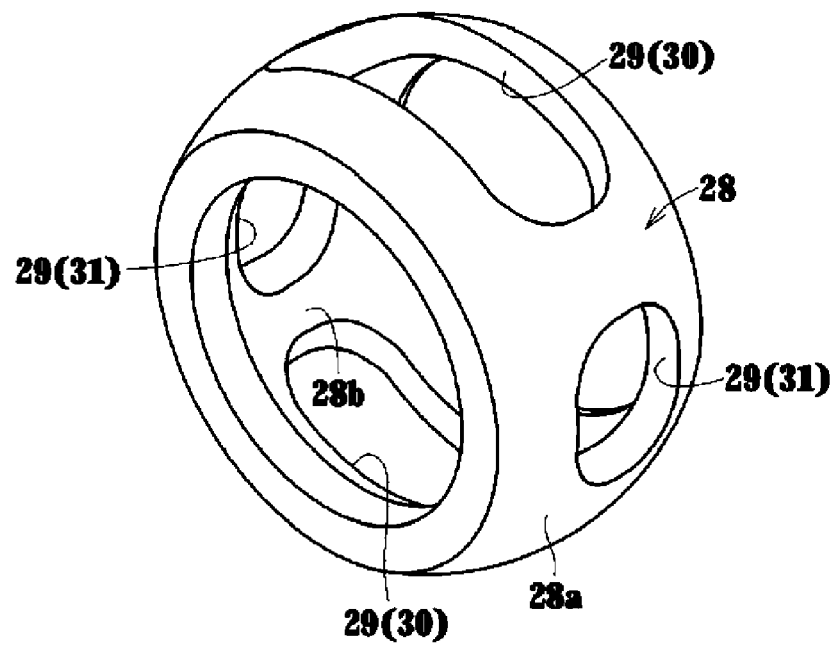
FIG. 10 is a perspective view illustrating the cage according to the sixth modification.
Figure 11:
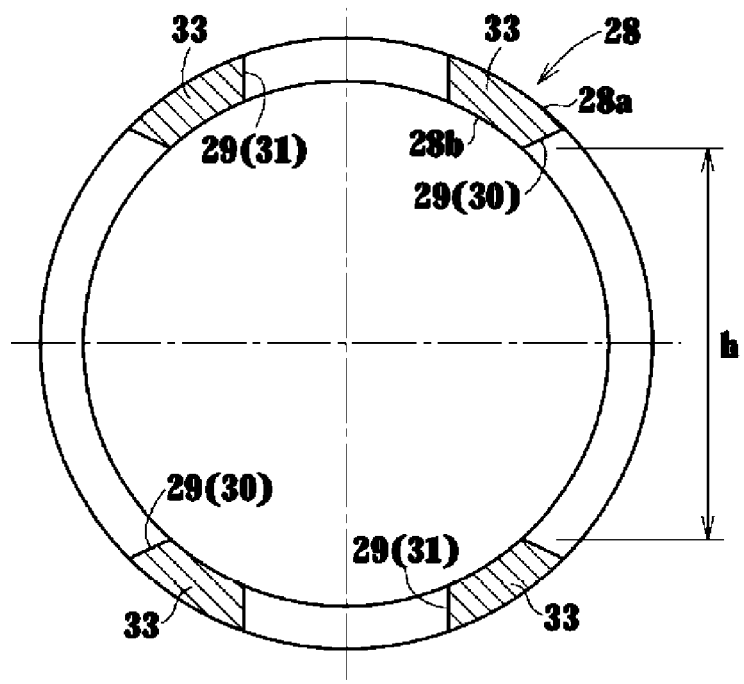
FIG. 11 is a cross-sectional view illustrating the cage according to the sixth modification.
Figure 12:
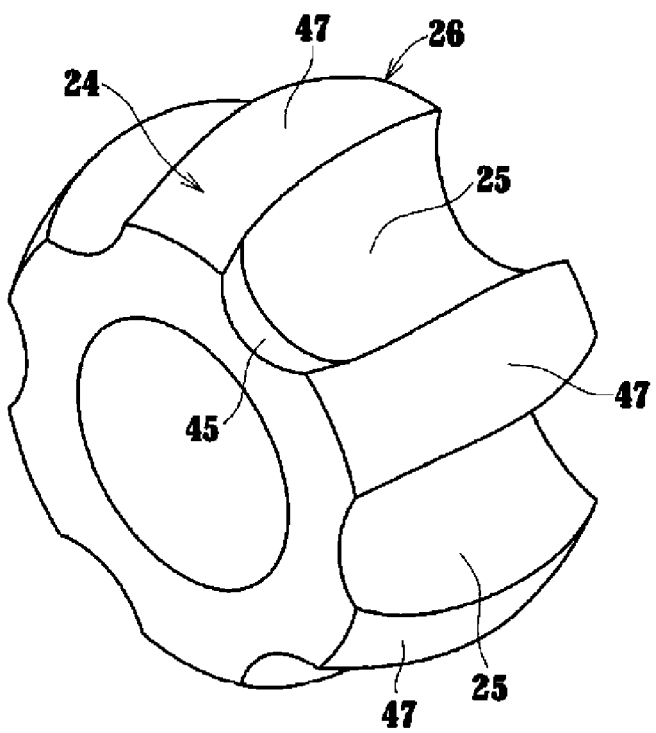
FIG. 12 is a perspective view illustrating the inner joint member according to a modification.
Figure 13:
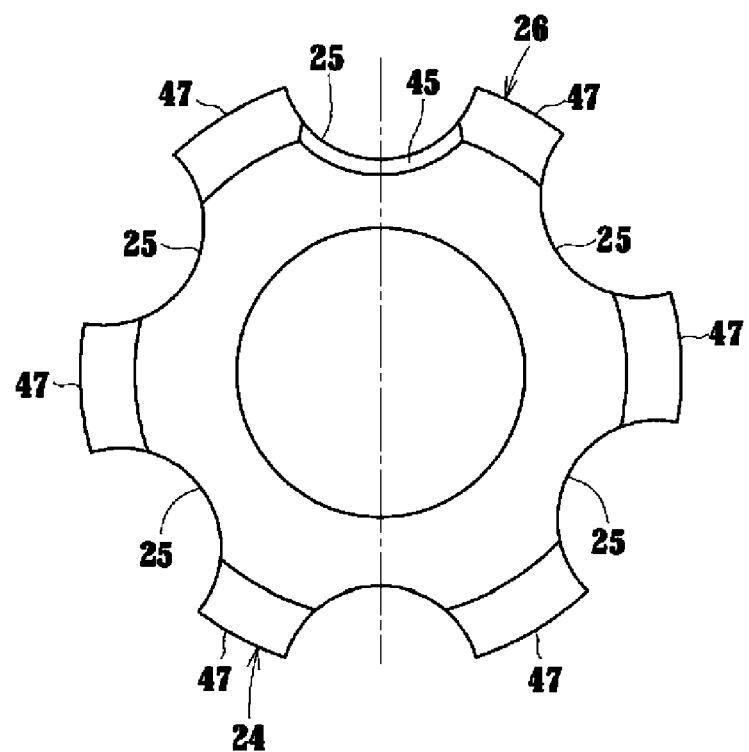
FIG. 13 is a front view illustrating the inner joint member illustrated in FIG. 12.
Figure 14:
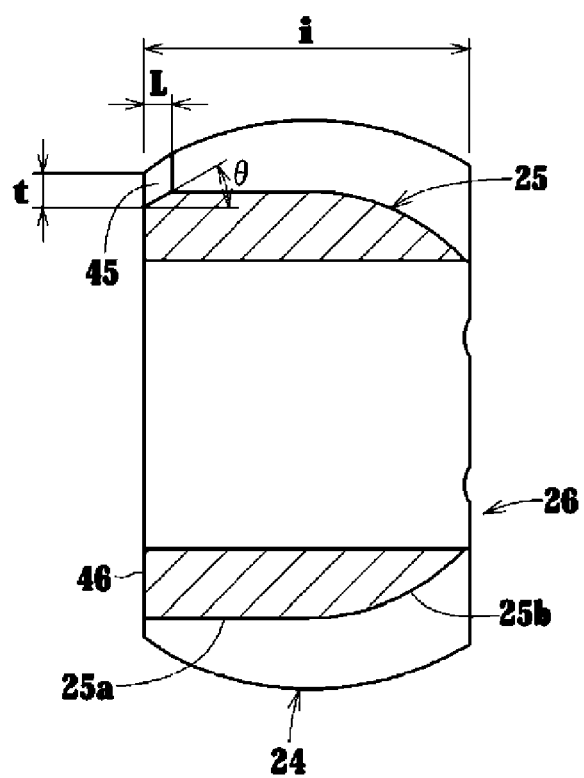
FIG. 14 is a cross-sectional view illustrating the inner joint member illustrated in FIG. 12.

Further, as illustrated in FIGS. 9 and 11, a long circular hole having no swell portion 36 can be provided to the long pocket 30. This configuration cannot obtain the effects of the swell portion 36, but can achieve an improvement in property of incorporating the inner joint member 26 into the cage 28 and an improvement in lightweight property.

As illustrated in FIGS. 12 to 15, a cutout portion 45 can be provided in the inner end portion of one track groove 25 (25A) of the inner joint member 26. In this case, the cutout portion 45 is constituted by a tapered surface that is formed on a corner portion of the inner end and an inner joint member end surface 46. The cutout portion 45 can be conducted by machine working or plastic working.

Figure 15:
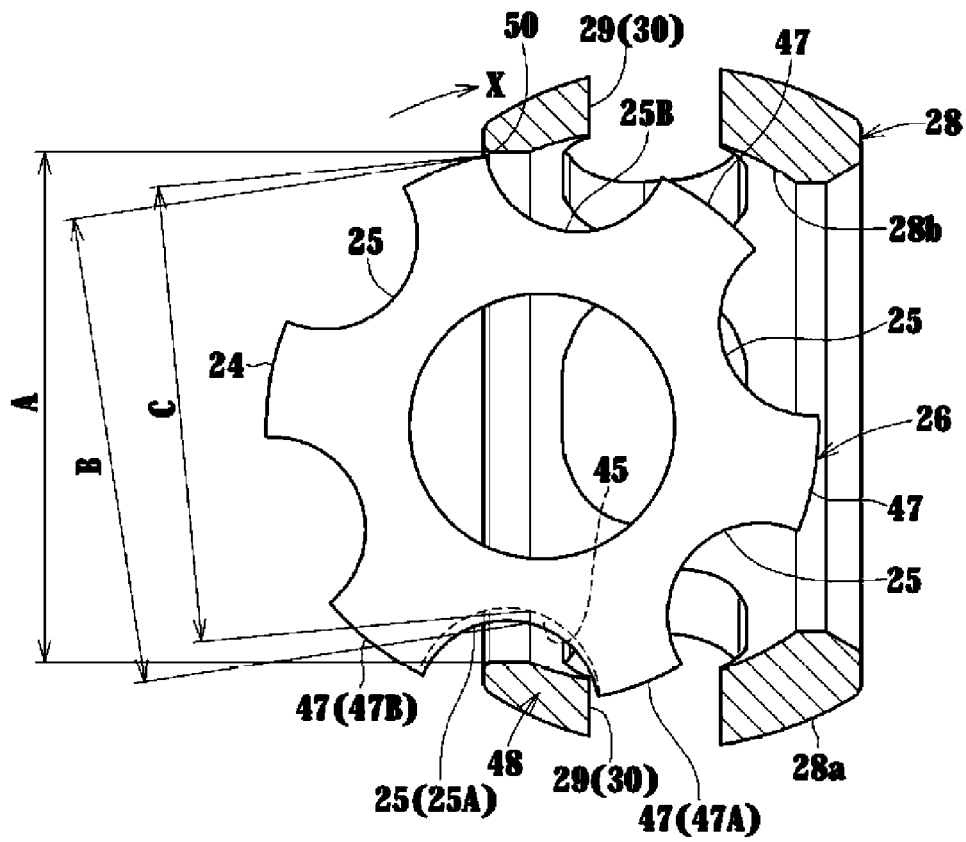
FIG. 15 is a cross-sectional view illustrating a method of incorporating the inner joint member illustrated in FIG. 12 into the cage.

Incidentally, when the inner joint member 26 is incorporated into the cage 28, the inner joint member 26 is arranged so that its axial line is perpendicular to the axial line of the cage 28 (state in which the inner joint member 26 rotates with respect to the cage 28 by 90°). In that state, as illustrated in FIG. 15, a part of the outer spherical surface 24 of the inner joint member 26 (protruding portion 47A between the track grooves 25 adjacent in the circumferential direction) is dropped into the pocket 29 (long pocket 30) of the cage 28. That is, the track groove 25A in which the cutout portion 45 is formed is fitted into an outer frame portion 48 that is at the thinner side of the pocket 30, the protruding portion 47A that is formed on the counterclockwise side of the track groove 25A is dropped into the pocket 30 of the cage 28, and the inner joint member 26 is rotated in a direction indicated by an arrow X centered on the bottom of the cutout portion 45. In this situation, the rotation radius C can be made smaller than the rotation radius B having no cutout portion 45 (rotation radius of the conventional product). Herein, the rotation radius C is a length between the bottom center portion of the cutout portion 45 and one opening edge 50 of the track grooves 25B opposite to the track grooves 25A by 180 degrees.

For that reason, when it is assumed that the faucet diameter of the cage 28 is A, the rotation radius of the inner joint member 26 is B in the conventional product and C in the product of the present invention, A−B<A−C is established because of B>C. As a result, the faucet diameter A in the product of the present invention can be made smaller than that of the conventional product, and the thickness of the outer frame portion 48 at the thinner side can be increased.

After the inner joint member 26 has been fitted into the cage 28, the inner joint member 26 is rotated with respect to the cage 28 by 90°, the axial line of the inner joint member 26 is accorded with the axial line of the cage 28, and the inner joint member is arranged in a regular posture. As a result, the inner joint member 26 can be incorporated into the cage 28.

The cutout portion 45 is provided at the inner end portion of the track groove 25, and hence the inner joint member 26 can be rotated from the cutout portion 45 when the inner joint member 26 is incorporated into the cage 28, and the rotation radius of the inner joint member 26 can be reduced. For that reason, a larger space can be secured between the faucet inner diameter of the cage 28 and the inner joint member 26, and hence the faucet diameter of the cage 28 can be set to be smaller by that much. As a result, the sectional area of the cage 28 on the faucet side can be enlarged, the rigidity of the thin outer frame portion 48 of the cage 28 can be improved, and the spherical surface contact area can be secured. As a result, an increase in contact surface pressure can be prevented, the heat generation or the deterioration of the durability can be avoided, and the deformation of the cage 28 and the deterioration of the strength can be also avoided. That is, the rigidity of the cage 28 can be improved without a reduction in load capacity and spherical area of the inner joint member 26. Further, the area of the inner spherical surface 28b of the cage 28 can be increased, and hence there are advantages in that a contact area of the inner joint member 26 with the outer spherical surface 24 can be increased, the rigidity is improved, and the durability is stabilized.

The size of the cutout portion 45 (taper angle θ, axial length L, radial length t, and the like) can be changed within the range in which the rotation radius of the inner joint member 26 can be reduced when the inner joint member 26 is incorporated into the cage 28. However, when the rotation radius of the inner joint member 26 is excessively large, the strength of the inner joint member 26 is weak, and the ball rolling range of the track groove 25 is reduced. Further, when the rotation radius of the inner joint member 26 is excessively small, the rotation radius can be hardly reduced.

Figure 16:
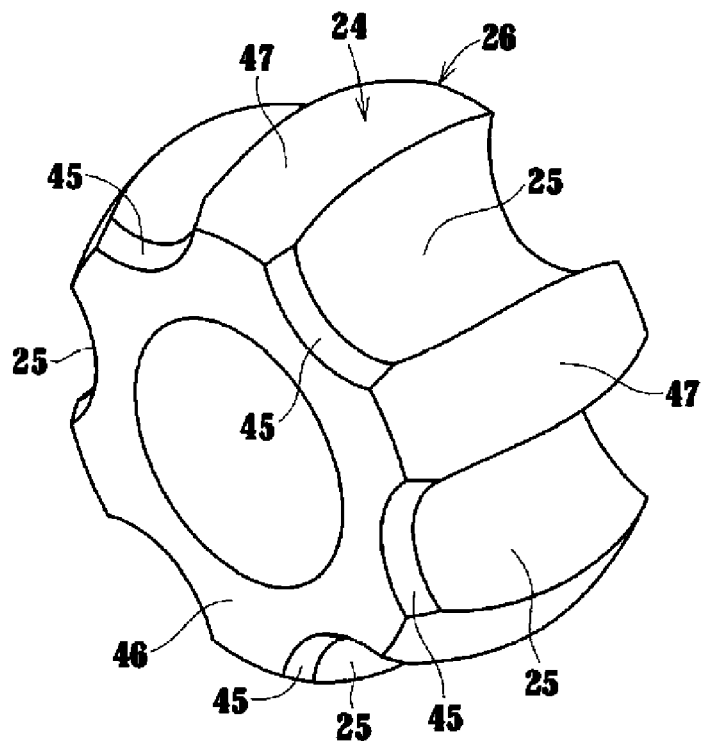
FIG. 16 is a perspective view illustrating an inner joint member according to another modification.
Figure 17:
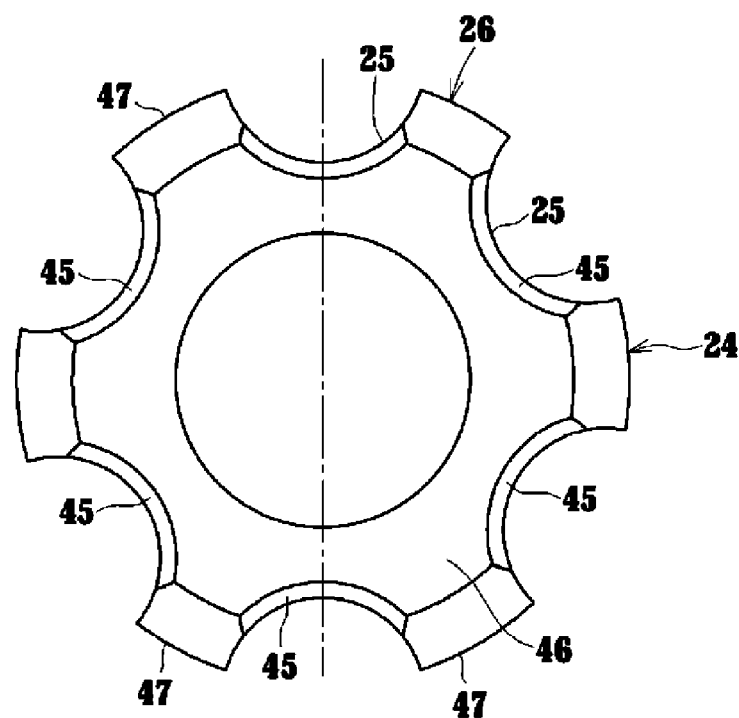
FIG. 17 is a front view illustrating the inner joint member illustrated in FIG. 16.
Figure 18:
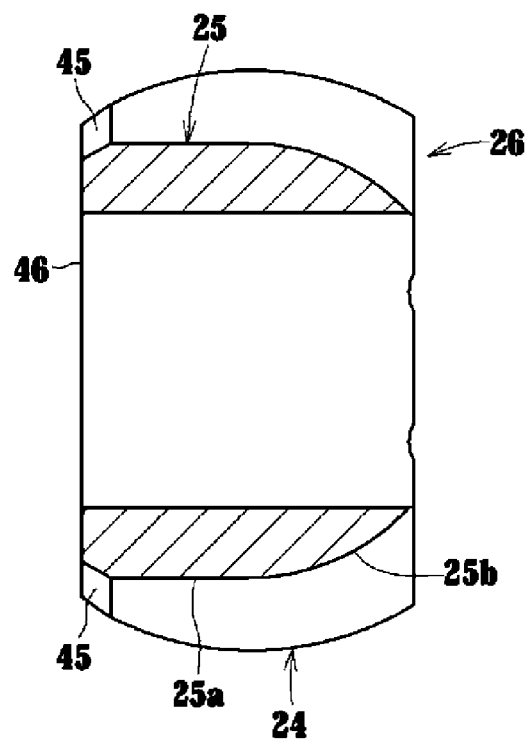
FIG. 18 is a cross-sectional view illustrating the inner joint member illustrated in FIG. 16.

Subsequently, FIGS. 16 to 18 illustrate that the cutout portions 45 are formed on the inner end portion of all the track grooves 25. With this configuration, even in the inner joint member 26, the inner joint member 26 can be rotated form one of the cutout portions 45 at the time of incorporation as in the case of the inner joint members 26 illustrated in FIGS. 11 to 14, and the rotation radius of the inner joint member 26 can be reduced. For that reason, the inner joint members 26 illustrated in FIGS. 16 to 18 have the same effects as those of the inner joint members 26 illustrated in FIGS. 11 to 14.

In particular, the cutout portions 45 are formed on the inner end portion of all the track grooves 25, and hence any protruding portion 47 can be inserted into the pocket 30 when the inner joint member 26 is incorporated into the cage 28. For that reason, there is an advantage in that the incorporation property can be improved.

Figure 19A:
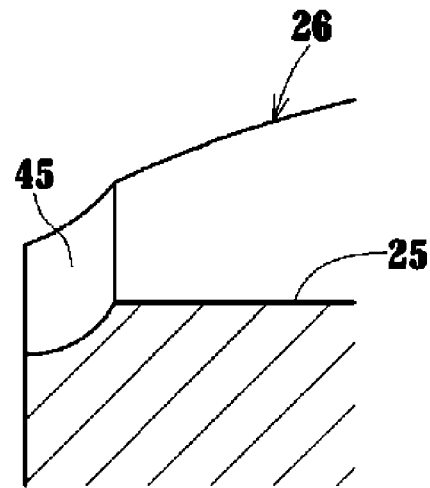
FIG. 19A is an enlarged cross-sectional view illustrating a cutout portion that is formed in the inner joint member according to a first modification.
Figure 19B:
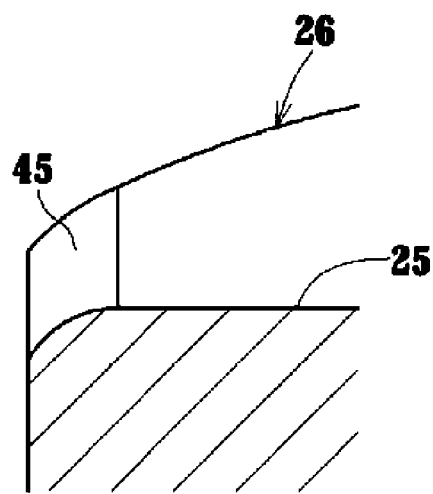
FIG. 19B is an enlarged cross-sectional view illustrating the cutout portion that is formed in the inner joint member according to a second modification.

Incidentally, in the above-mentioned respective embodiments, the cutout portion 45 is formed into a tapered surface shape that is sequentially reduced in diameter from the opening side track groove 25b side toward the inner joint member end surface 46 side. Alternatively, the cutout portion 45 can be configured as illustrated in FIGS. 19A and 19B. The cutout portion 45 illustrated in FIG. 19A is of a concave R-shape, and the cutout portion 45 illustrated in FIG. 19B is of a convex R-shape.

Figure 20A:
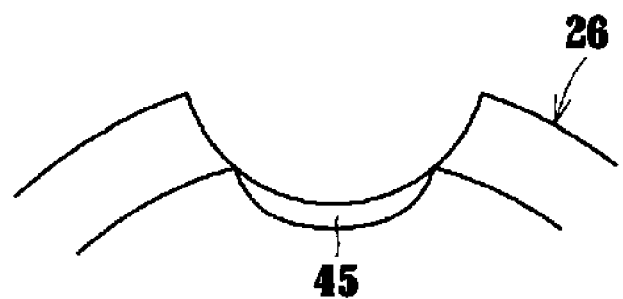
FIG. 20A is a front view illustrating the cutout portion that is formed in the inner joint member according to a third modification.
Figure 20B:
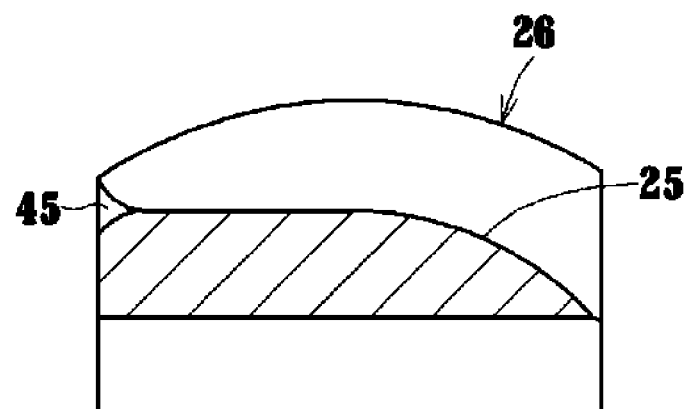
FIG. 20B is a cross-sectional view illustrating the cutout portion that is formed in the inner joint member according to the third modification.

Even with the cutout portions 45 illustrated in FIGS. 19A and 19B, the inner joint member 26 can be rotated from the cutout portion 45 at the time of incorporation, and the rotation radius of the inner joint member 26 can be reduced. Further, as illustrated in FIGS. 20A and 20B, the cutout portion 45 can be formed in a part of the track groove ends (bottom portion in the figure).

Figure 21:
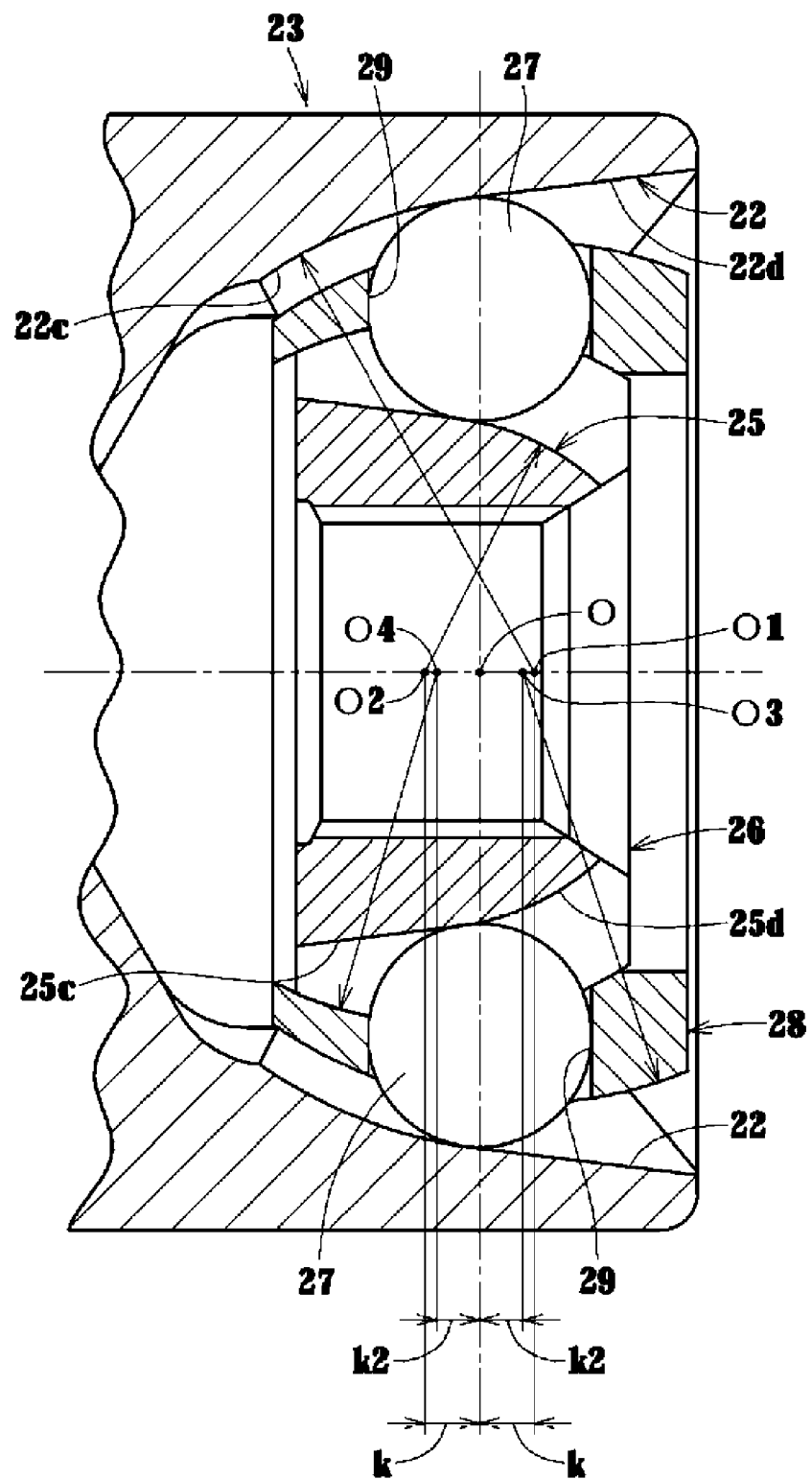
FIG. 21 is a longitudinal cross-sectional view illustrating the fixed type constant velocity universal joint according to a third embodiment of the present invention.

Then, FIG. 21 illustrates a third embodiment, and in this case, the track groove bottoms of the inner joint member 26 and the outer joint member 23 include the circular-arc portion and a tapered portion That is, the track grooves include an inner side track groove 22c in which the track groove bottom is the circular-arc portion, and an opening side track groove 22d in which the track groove bottom is sloped to the outer diameter side from the inner side toward the opening side.

The inner side track groove 22c shifts the center curvature O1 from the joint center O to the opening side of the outer joint member 23 in the axial direction. Further, each of the track grooves 25 of the inner joint member 26 includes an inner side track groove 25c in which the track groove bottom is sloped to the outer diameter side from the opening side toward the inner side, and an opening side track groove 25d in which the track groove bottom is the circular-arc portion. The center curvatures O2 of the opening side track grooves 25b are separated from the joint center O toward the inner sides opposite to the center curvatures O1 of the inner side track grooves 22a of the outer joint member 23 in the axial direction by equal distances k.

Similarly, in this case, the center curvature O3 of the outer spherical surface 28a of the cage 28 and the center curvature O4 of the inner spherical surface 28b of the cage 28 are offset with respect to the joint center O by equal distances oppositely to each other in the axial direction, and the offset amount of the cage 28 is substantially identical with the offset amounts of the track grooves 22 and 25.

Other configurations of the fixed type constant velocity universal joint illustrated in FIG. 21 are identical with those of the fixed type constant velocity universal joint illustrated in FIG. 1, and the same members are denoted by identical reference symbols, and description thereof is omitted.

For that reason, similarly, the fixed type constant velocity universal joint illustrated in FIG. 21 has the same operational effects as those of the fixed type constant velocity universal joint illustrated in FIG. 1. In FIG. 1, there is applied the undercut free type in which the track groove bottoms of the inner joint member 26 and the outer joint member 23 include the circular-arc portion and the straight portion, thereby making it possible to heighten the joint operating angle. In contrast, when the track groove bottom includes the circular-arc portion and the tapered portion as in the fixed type constant velocity universal joint illustrated in FIG. 21, the still higher angle can be obtained.

Figure 22:
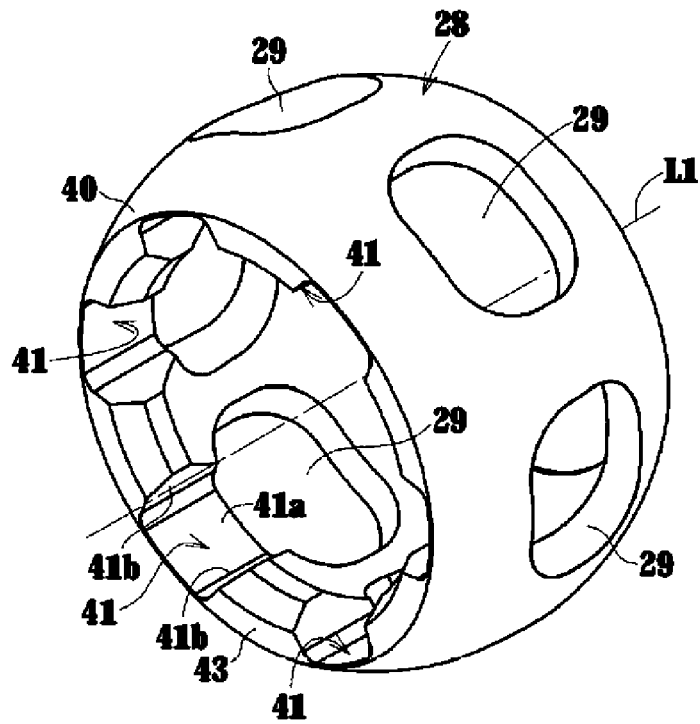
FIG. 22 is a perspective view illustrating the cage of the fixed type constant velocity universal joint illustrated in FIG. 21.
Figure 23:
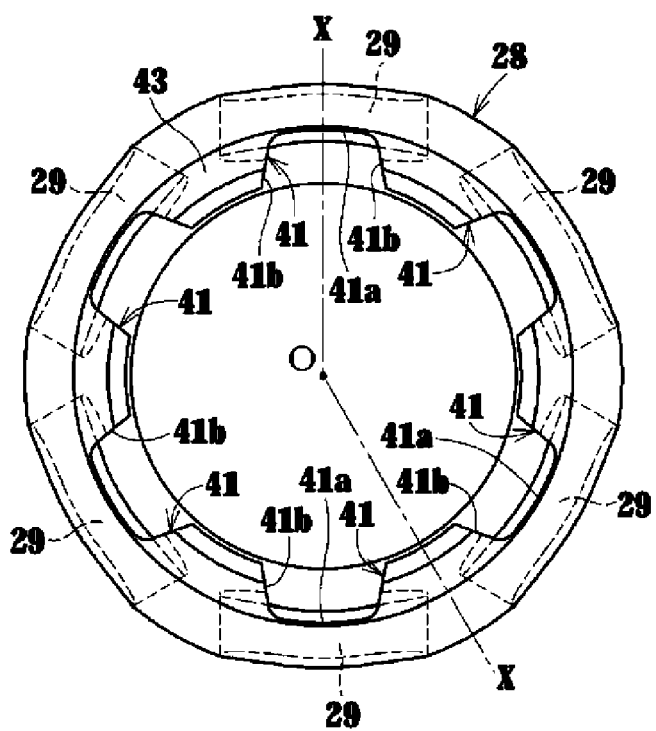
FIG. 23 is a front view illustrating the cage of the fixed type constant velocity universal joint illustrated in FIG. 21.
Figure 24:
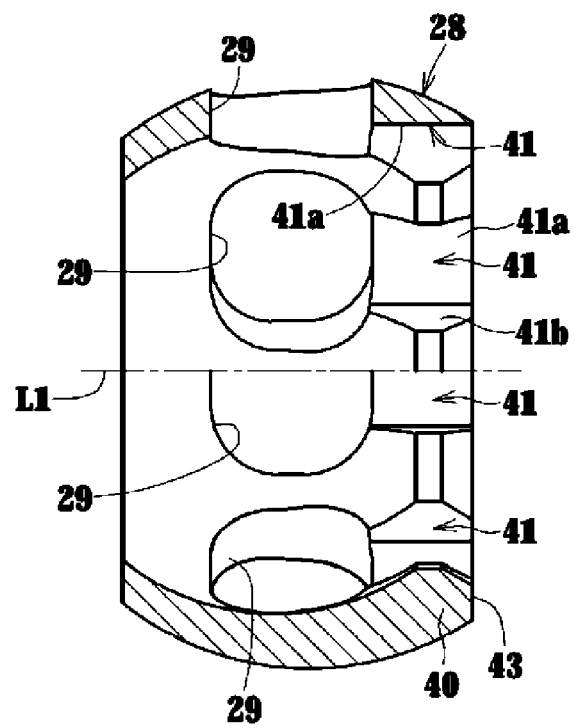
FIG. 24 is a cross-sectional view taken along the line X-O-X of FIG. 21.

Incidentally, as illustrated in FIGS. 22 to 24, in a thick portion 40 on the joint opening side of the cage 28, there are formed multiple grooves 41 at the same pitches as those of the pockets 29. The grooves 41 are opened to end surfaces 43 on the joint opening side and the pockets 29, and are trapezoidal in cross-section. That is, each of the grooves 41 is constituted by a circular-arc (spherical) bottom wall 41a, and side walls 41b and 41b extending to the radially inner side from circumferential end portions of the bottom wall 41a in a manner of slightly increasing diameter. The grooves 41 may be molded by plastic working, or may be molded by machine working (such as trimming).

Figure 25:
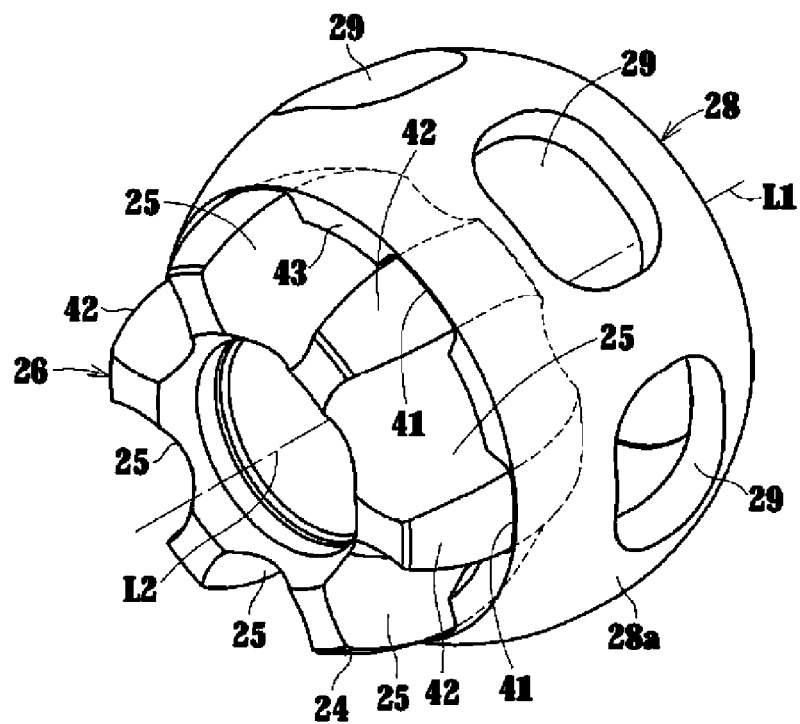
FIG. 25 is a perspective view illustrating a cage and an inner joint member of the fixed type constant velocity universal joint illustrated in FIG. 21.
Figure 26:
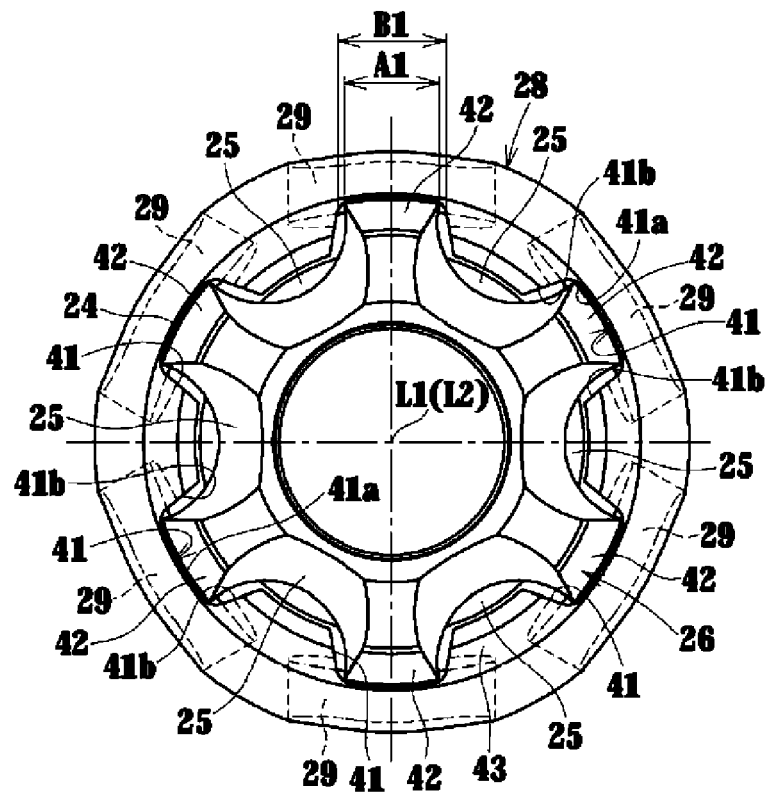
FIG. 26 is a front view illustrating the cage and the inner joint member of the fixed type constant velocity universal joint illustrated in FIG. 21.
Figure 27:
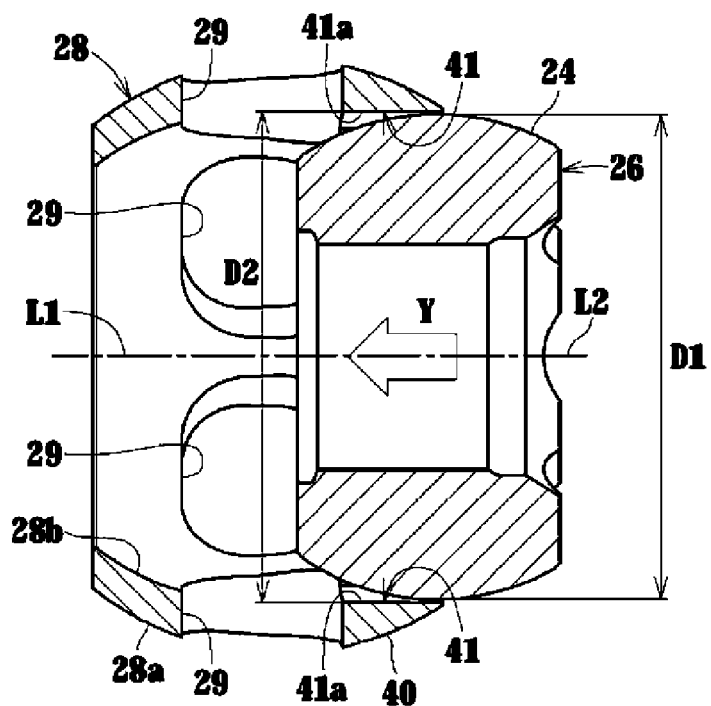
FIG. 27 is a cross-sectional view illustrating the cage and the inner joint member of the fixed type constant velocity universal joint illustrated in FIG. 21.
Figure 28:
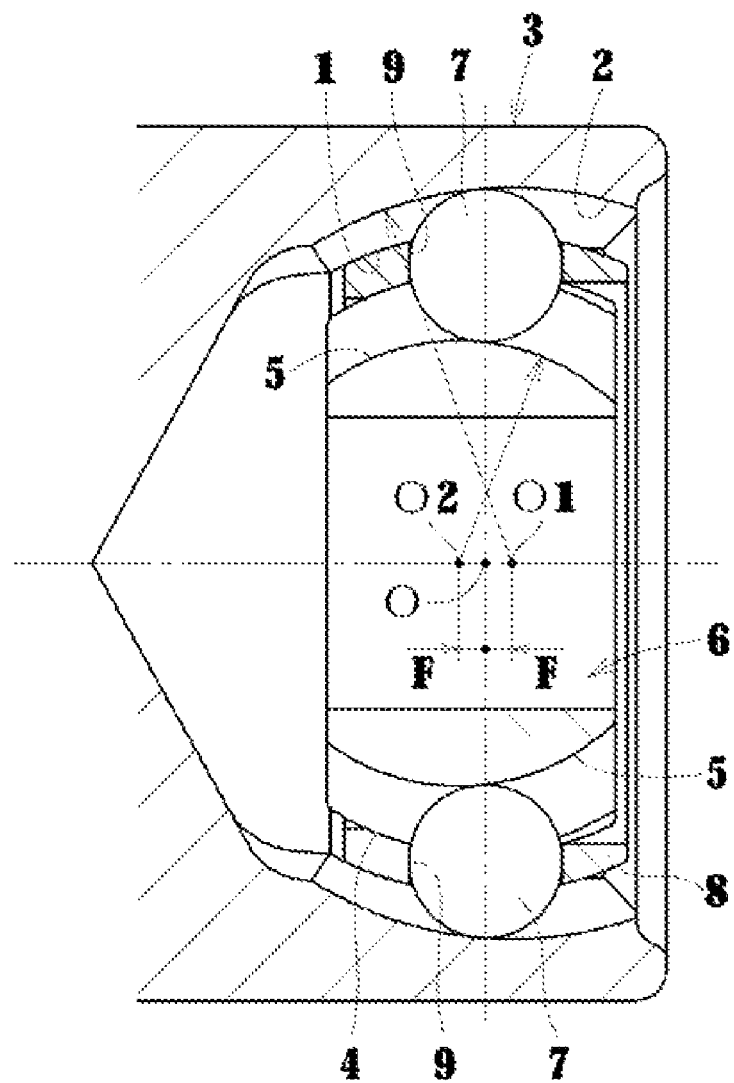
FIG. 28 is a longitudinal cross-sectional view illustrating a conventional fixed type constant velocity universal joint.

As illustrated in FIGS. 25 to 27, each protruding portion 42 between the track grooves 25 adjacent to each other in the circumferential direction of the inner joint member 26 can be fitted into each of the grooves 41 along the axial direction. That is, as illustrated in FIG. 26, a circumferential dimension B of the bottom wall 41a of each of the grooves 41 is set to be larger than a maximum circumferential dimension A of the protruding portion 42 of the inner joint member 26. At the same time, as illustrated in FIG. 27, a diameter D2 of a circular arc apart of which is constituted by the bottom wall 41a of each of the grooves 41 is set to be larger than a maximum outer diameter D1 of the protruding portion 42 of the inner joint member 26 (maximum outer diameter of outer spherical surface 24 of inner joint member 26).

Next, a method for incorporating the inner joint member 26 into the cage 28 structured as described above is described. First, the axial line L2 of the inner joint member 26 and the axial line L1 of the cage 28 are accorded with each other, and the protruding portion 42 of the inner joint member 26 and each of the grooves 41 of the cage 28 are matched in phase with each other.

In this case, as described above, each of the protruding portions 42 can be fitted into each of the grooves 41 along the axial direction. Thus, in this state, as illustrated in FIGS. 25 to 27, the inner joint member 26 can be fitted into the cage 28 as indicated by an arrow Y (refer to FIG. 7). With this, the inner joint member 26 can be incorporated into the cage 28. That is, after the inner joint member 26 is fitted into the cage 28, it is unnecessary to rotate the inner joint member 26 by 90 degrees.

Provision of the grooves 41 in the thick portion 40 on the joint opening side of the cage 28 enables incorporation of the inner joint member 26 into the cage 28. Thus, on the joint inner side of the cage 28, it is possible to decrease a faucet diameter so as to secure a large inner spherical area on the joint inner side. As a result, it is possible to enhance durability of the cage 28. Even on the joint opening side of the cage 28, it is unnecessary to form cutout portions which eliminate the spherical portion. As a result, it is possible to secure the area of the spherical portion so as to realize smooth rotation. In addition, after the inner joint member 26 is fitted into the cage 28, it is unnecessary to rotate the inner joint member 26 by 90 degrees. Thus, there is an advantage of simplifying the incorporating operation.

Figure 29:
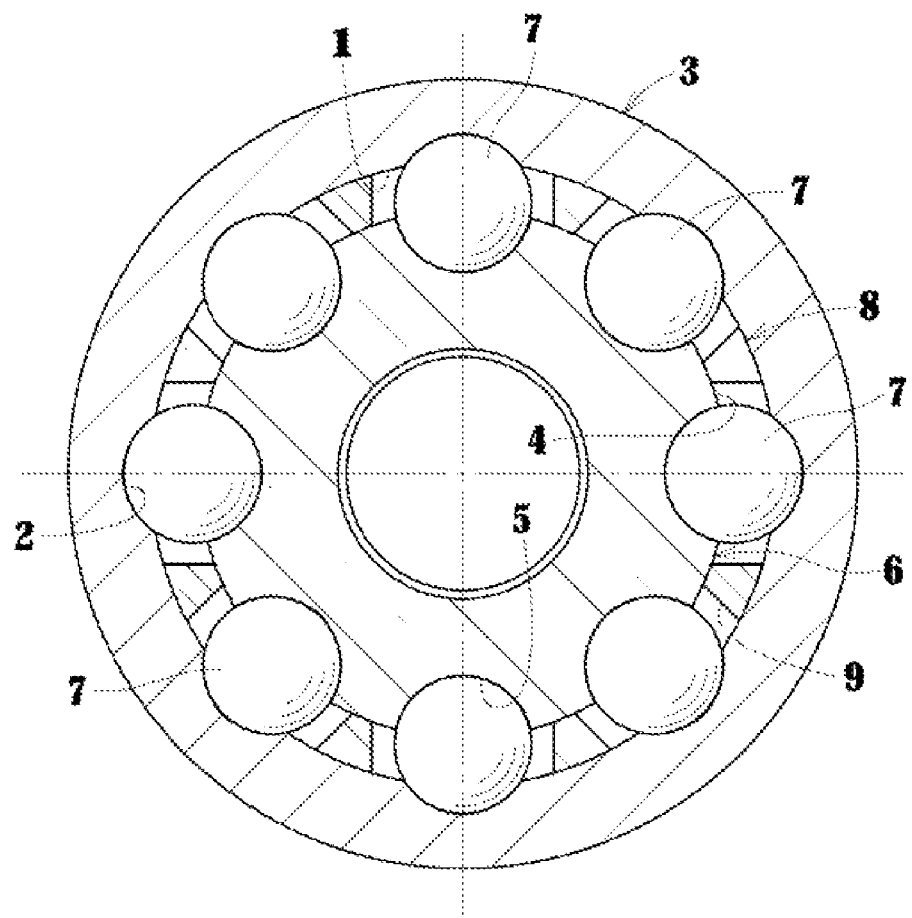
FIG. 29 is a lateral cross-sectional view illustrating the conventional fixed type constant velocity universal joint.
Figure 30:
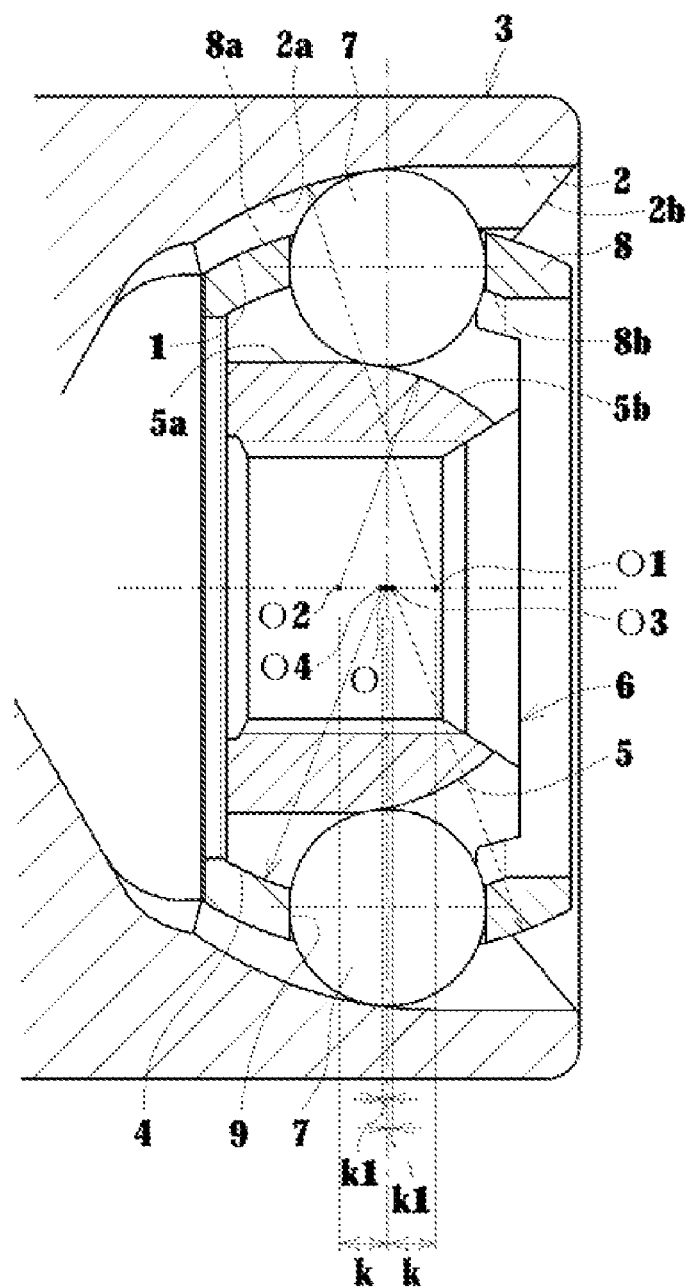
FIG. 30 is a cross-sectional view illustrating another conventional fixed type constant velocity universal joint.
Figure 31:
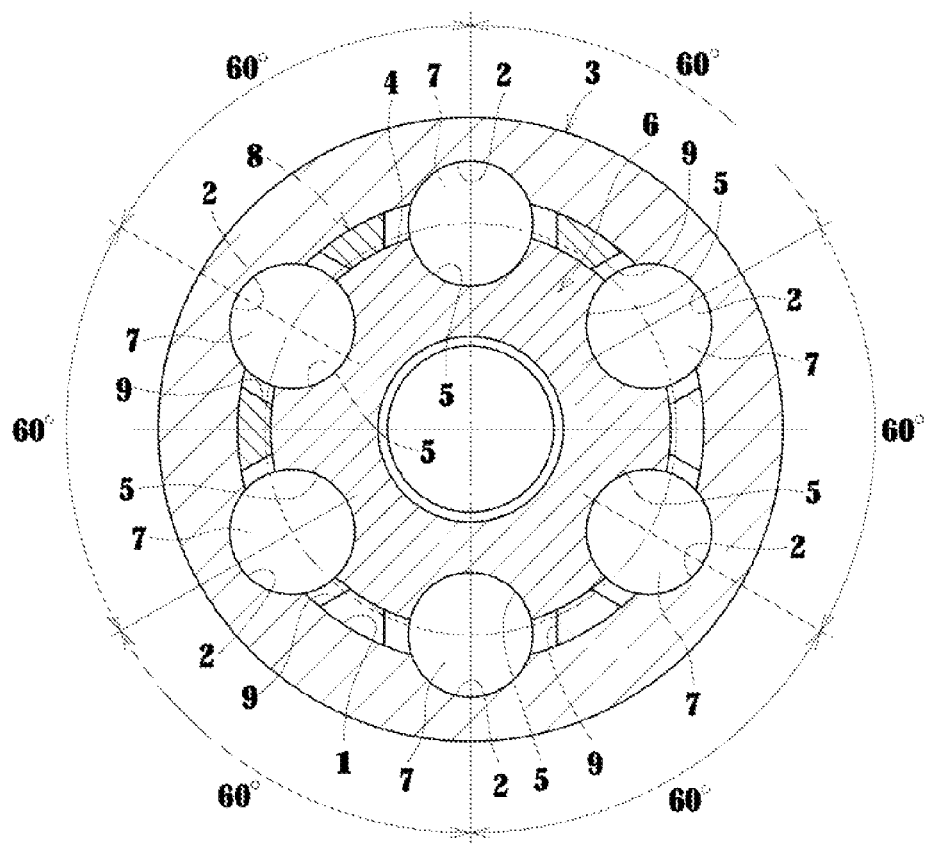
FIG. 31 is a lateral cross-sectional view illustrating the conventional fixed type constant velocity universal joint illustrated in FIG. 30.
Figure 32:
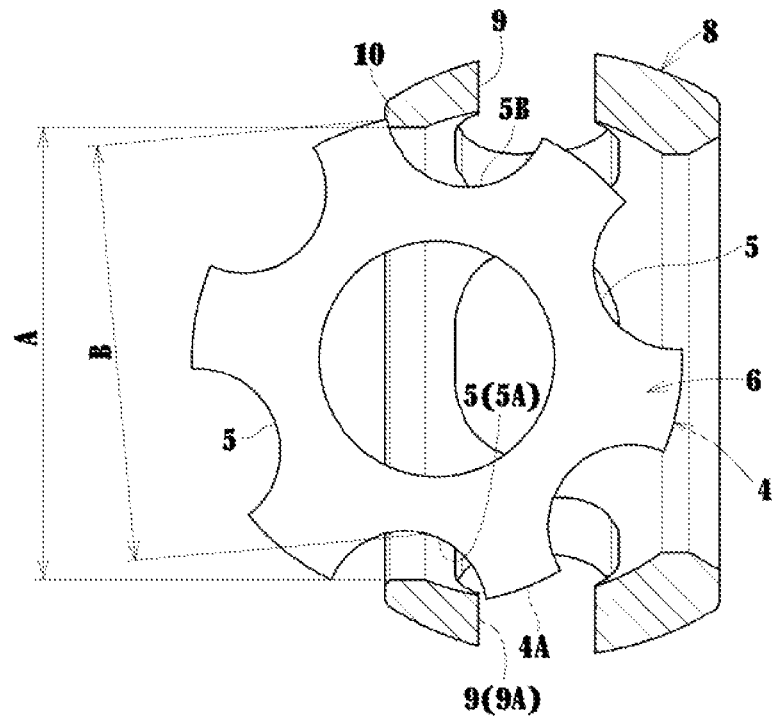
FIG. 32 is a cross-sectional view illustrating an incorporating step of an inner joint member into a cage.
Figure 33:
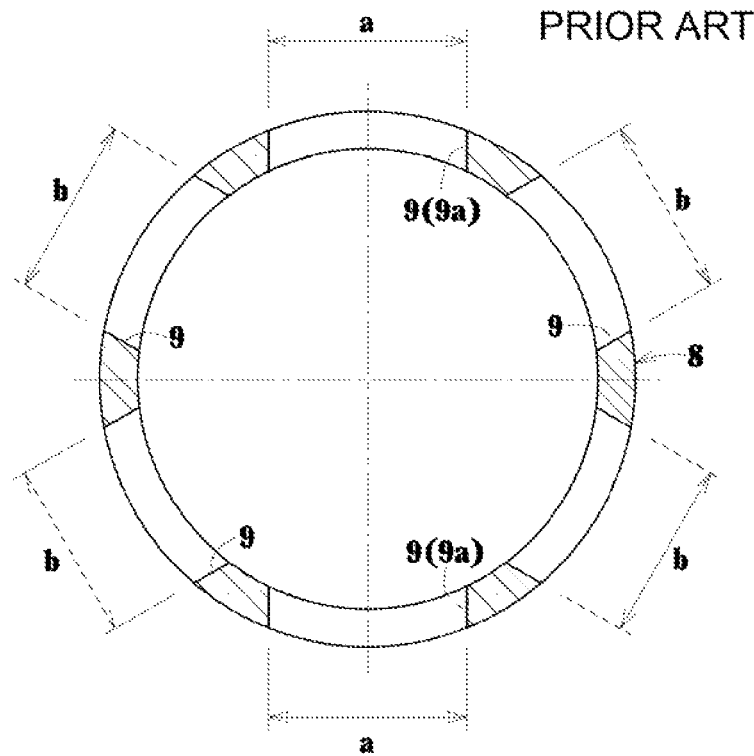
FIG. 33 is a lateral cross-sectional view illustrating a conventional cage.
Figure 34:
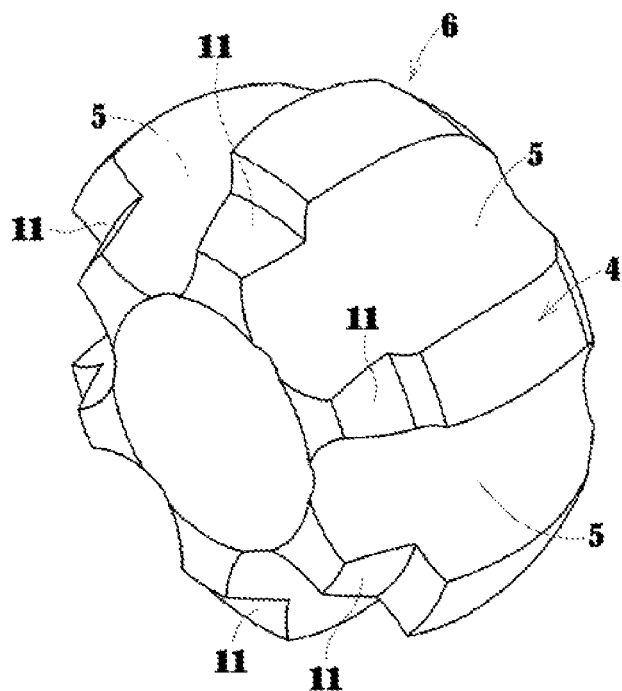
FIG. 34 is a perspective view illustrating a conventional inner joint member.
Figure 35:
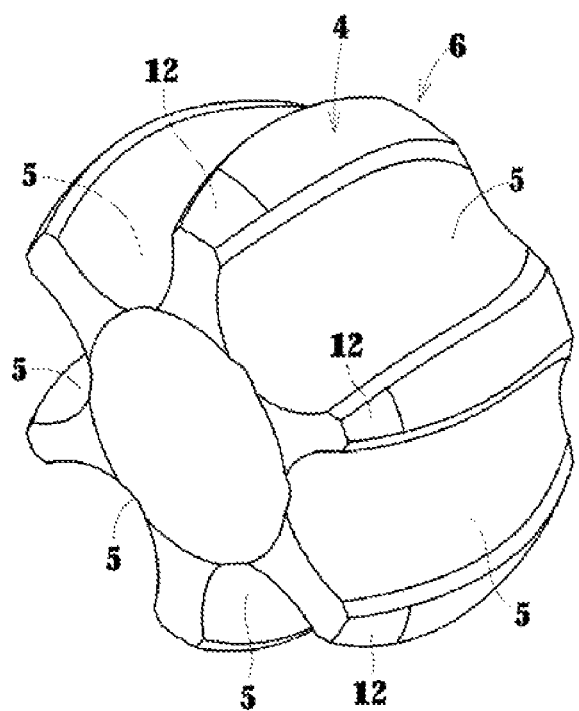
FIG. 35 is a perspective view illustrating another conventional inner joint member.
Figure 36:
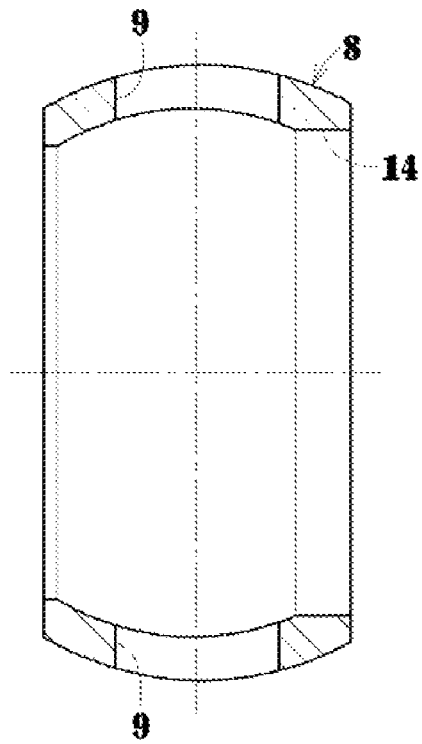
FIG. 36 is a cross-sectional view illustrating the conventional cage.
Figure 37:
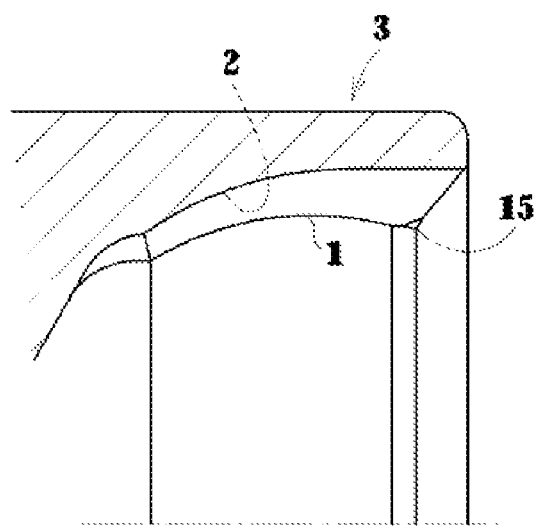
FIG. 37 is a cross-sectional view illustrating a main portion of a conventional outer joint member.
Figure 38:
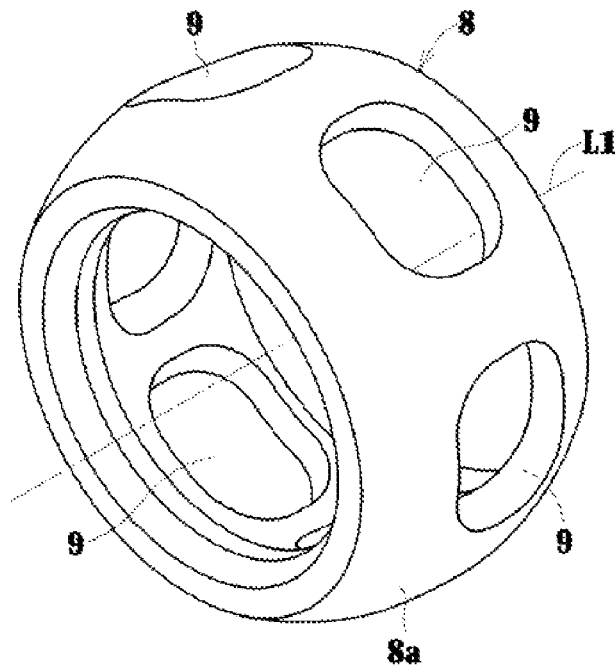
FIG. 38 is a perspective view illustrating a cage of a fixed type constant velocity universal joint.
Figure 39:
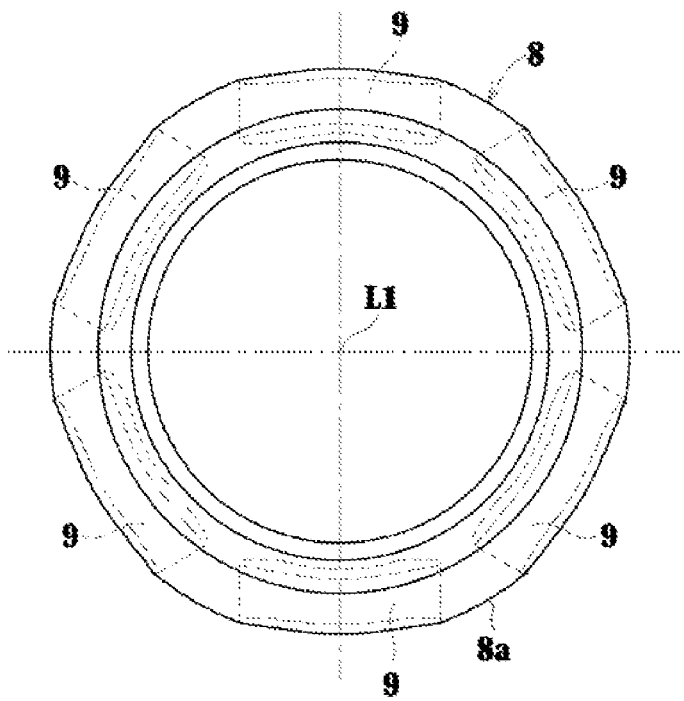
FIG. 39 is a front view illustrating the cage of the fixed type constant velocity universal joint illustrated in FIG. 38.
Figure 40:
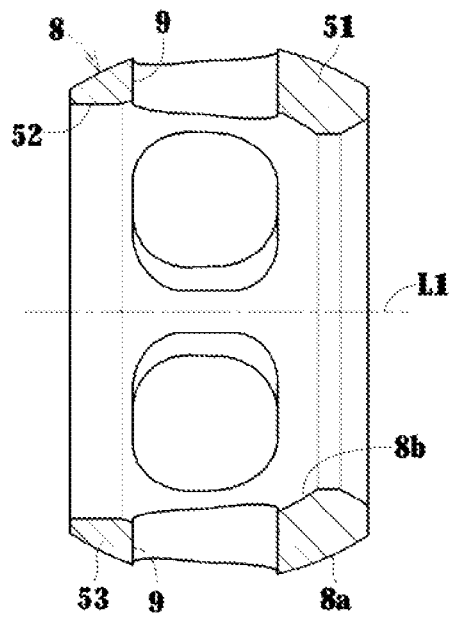
FIG. 40 is a cross-sectional view illustrating the cage of the fixed type constant velocity universal joint illustrated in FIG. 38.
Figure 41:
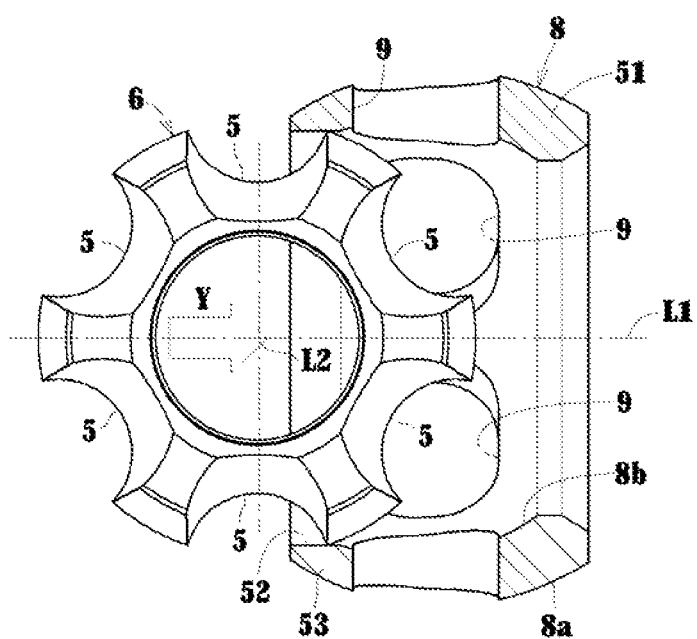
FIG. 41 is a cross-sectional view illustrating an incorporating state of the inner joint member into the cage of the fixed type constant velocity universal joint illustrated in FIG. 38.
Figure 42:
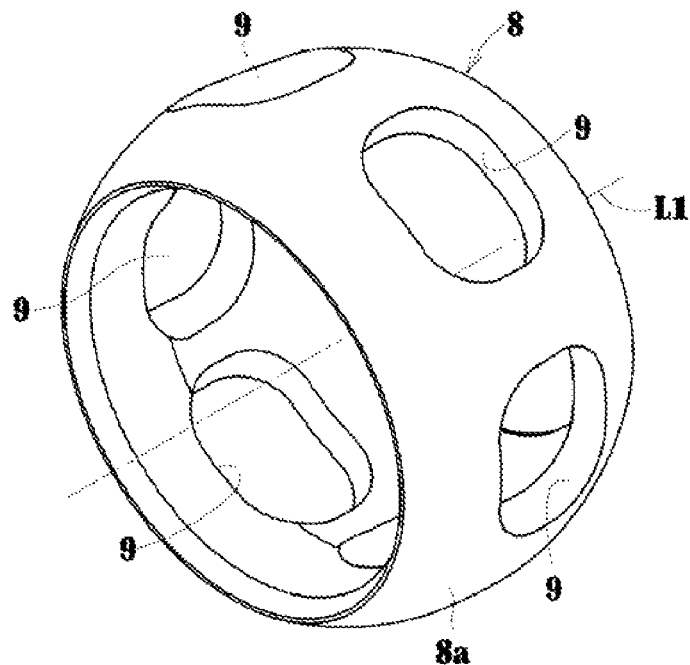
FIG. 42 is a perspective view illustrating another conventional cage of the fixed type constant velocity universal joint.
Figure 43:
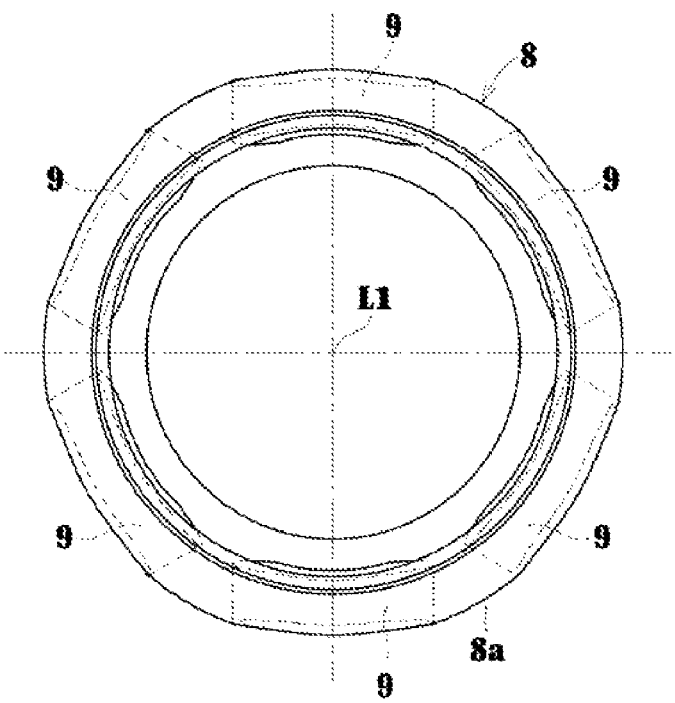
FIG. 43 is a front view illustrating the cage of the fixed type constant velocity universal joint illustrated in FIG. 42.
Figure 44:
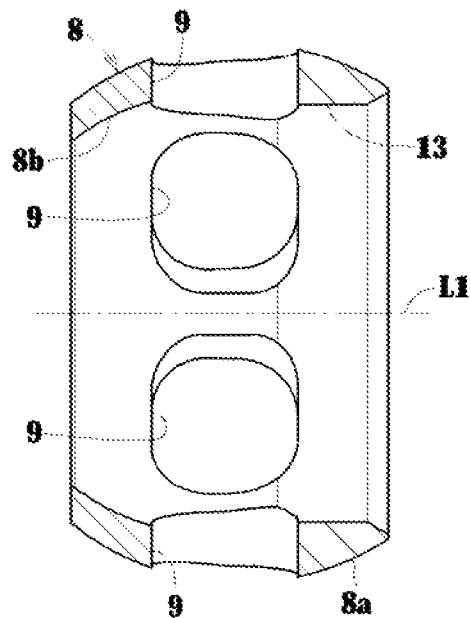
FIG. 44 is a cross-sectional view illustrating the cage of the fixed type constant velocity universal joint illustrated in FIG. 43.
Figure 45:
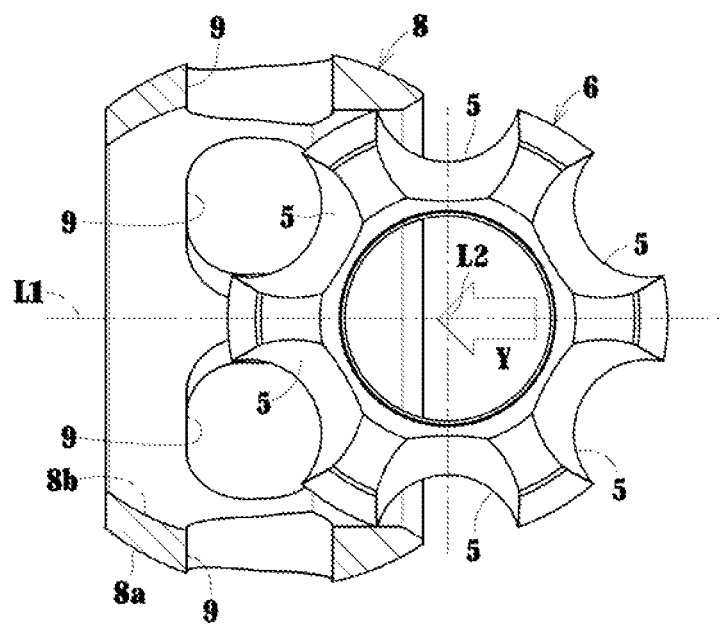
FIG. 45 is a cross-sectional view illustrating an incorporating state of an inner joint member of the cage of the fixed type constant velocity universal joint illustrated in FIG. 44.
Figure 46:
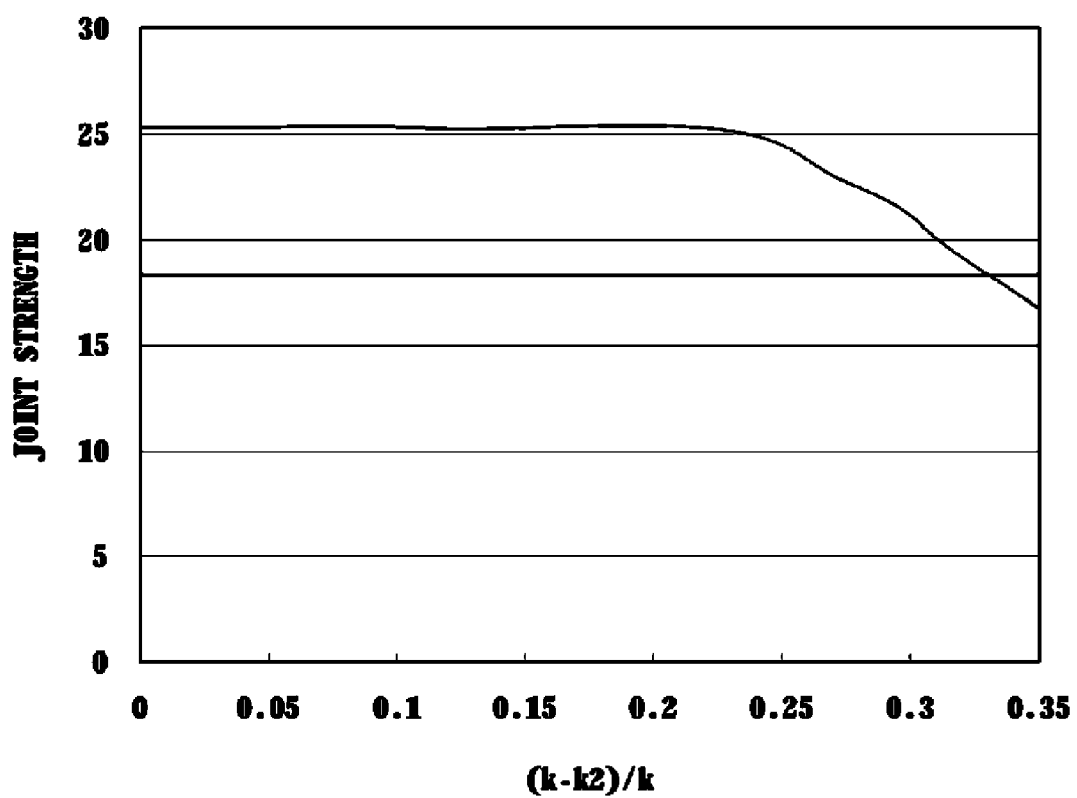
FIG. 46 is a graph showing a relationship between an offset amount k and a shift amount (k−k2).

Incidentally, in the above-mentioned embodiments, the center curvature O1 and the center curvature O3 are arranged at positions slightly shifted from each other, and the center curvature O2 and the center curvature O4 are arranged at positions slightly shifted from each other. However, the center curvature O1 and the center curvature O3 may be positioned at the same position, and the center curvature O2 and the center curvature O4 may be positioned at the same position. Further, when the center curvature O1 and the center curvature O3 are shifted from each other and when the center curvature O2 and the center curvature O4 are shifted from each other, the shift amounts thereof can be arbitrarily set. However, it is preferred to set the ratio between an offset amount k and a shift amount (k−k2) to (k−k2)/k≦0.3. In the case of (k−k2)/k>0.3, the difference with respect to a conventional fixed type constant velocity universal joint illustrated in FIG. 29 is eliminated. Thus, the depth of the track grooves on the joint inner side is decreased, and it is impossible to increase the thickness of the cage 28 on the opening side. As a result, necessary strength of the joint (FIG. 45) cannot be secured.

While the embodiments of the present invention are described above, the present invention is not limited to the above-mentioned embodiments, and various modification may be made thereto. For example, in the above-mentioned embodiments, there is a case where the cutout portion 45 is formed on the one of the track grooves 25 of the inner joint member 26, and a case where the cutout portion 45 is formed on each of all the track grooves 25 of the inner joint member 26. However, the cutout portion 45 may be formed on not all the track grooves 25 but on two or more of the track grooves 25. Further, the size of the cutout portion 45 can be changed within the range in which the rotation radius of the inner joint member 26 at the time of incorporation of the inner joint member 26 into the cage 28 can be reduced. However, excessive increase in the size thereof causes insufficiency of strength of the inner joint member 26 and reduction in rolling range of the balls in the track grooves 25, and excessive decrease causes insufficient reduction in the rotation radius.

The circumferential intervals h between the long pockets 30 can be variously set within the range in which incorporating properties of the cage 28 into the inner joint member 26 is enhanced and rigidity of the window pillar 33 is not deteriorated. Further, the inter-track groove shoulder width dimension f, the pocket width g in the axial direction of the cage 28, and the like can also be set in consideration of incorporating properties and the like of the cage 28 into the outer joint member 23. In the above-mentioned embodiments, there is used a constant velocity universal joint of an undercut free type (UJ) in which the track grooves 22 and 25 are constituted by the straight grooves 22b and 25a, and a constant velocity universal joint in which the track groove bottoms of the inner joint member 26 and the outer joint member 23 are provided with the circular-arc portions and the tapered portions. Instead of the undercut free type (UJ), a constant velocity universal joint of a birfield type (BJ) without the straight grooves may be used.

INDUSTRIAL APPLICABILITY

The present invention is applicable to a constant velocity universal joint used for a power transmission system in automobiles or various industrial machines and allowing only angular displacement between two shafts on a driving side and a driven side, more specifically, to a constant velocity universal joint adopting a birfield type (BJ) or an undercut free type (UJ).

REFERENCE SIGNS LIST 21 inner spherical surface
22 track groove
24 outer spherical surface
25 track groove
27 ball
28 cage
28a outer spherical surface
28b inner spherical surface
29 pocket
30 long pocket
31 short pocket
35 cutout portion

The invention claimed is:

1. A fixed type constant velocity universal joint, comprising:
   an outer member having an inner spherical surface in which multiple track grooves are formed;
   an inner member having an outer spherical surface in which multiple track grooves are formed;
   a plurality of balls interposed between the track grooves of the outer member and the track grooves of the inner member so as to transmit torque; and
   a cage having pockets for accommodating the balls, the cage being interposed between the outer member and the inner member, and the cage having a rigid structure, wherein:
   the cage comprises four pockets including a pair of long pockets with large circumferential intervals and a pair of short pockets with small circumferential intervals;
   the cage having the rigid structure has centers of the long pockets positioned 180 degrees from each other along a circumferential direction and centers of the short pockets positioned 180 degrees from each other along the circumferential direction so that the long pockets and the short pockets are arranged alternately to each other along the circumferential direction, and has two of the balls accommodated in each of the long pockets and one of the balls accommodated in each of the short pockets; and
   an inner end portion of at least one of the track grooves of the inner member has a cutout portion provided thereto.

2. A fixed type constant velocity universal joint according to claim 1, wherein a center curvature of the track grooves of the outer member and a center curvature of the track grooves of the inner member are offset oppositely to each other in an axial direction by equal distances with respect to a joint center, and a center curvature of an outer spherical surface of the cage and a center curvature of an inner spherical surface of the cage are offset oppositely to each other in the axial direction by equal distances with respect to the joint center so that an offset amount of the cage is increased so as to be substantially equal to an offset amount of the track grooves.

3. A fixed type constant velocity universal joint according to claim 1, wherein:
   a pitch angle on a pitch circle diameter (PCD) between the two balls accommodated in each of the long pockets is lower than 60 degrees; and
   a pitch angle on the PCD between one of the two balls accommodated in each of the long pockets and an adjacent ball in one of the short pockets is higher than 60 degrees.

4. A fixed type constant velocity universal joint according to claim 1, wherein an axial length of the inner member is smaller than each of the circumferential intervals of the long pockets.

5. A fixed type constant velocity universal joint according to claim 1, wherein a shoulder width dimension between two of the track grooves of the outer member is smaller than a pocket width in an axial direction of the cage, the two of the track grooves corresponding to each of the long pockets of the cage.

6. A fixed type constant velocity universal joint according to claim 1, wherein track groove bottoms of each of the inner member and the outer member are provided with circular-arc portions and straight portions.

7. A fixed type constant velocity universal joint according to claim 1, wherein track groove bottoms of each of the inner member and the outer member are provided with circular-arc portions and tapered portions.

8. A fixed type constant velocity universal joint according to claim 1, wherein the track grooves of the inner member and the track grooves of the outer member are arranged in a circumferential direction at irregular pitches.

* * * * *